United States Patent [19]

Liu et al.

[11] Patent Number: 5,544,280

[45] Date of Patent: Aug. 6, 1996

[54] UNIPOLAR TERMINAL-ATTRACTOR BASED NEURAL ASSOCIATIVE MEMORY WITH ADAPTIVE THRESHOLD

[75] Inventors: Hua-Kuang Liu, Pasadena; Jacob Barhen, La Crescenta, both of Calif.; Nabil H. Farhat, Philadelphia, Pa.; Chwan-Hwa Wu, Auburn, Ala.

[73] Assignee: The United States of America as represented by the Administrator of the National Aeronautics and Space Administration, Washington, D.C.

[21] Appl. No.: 73,018

[22] Filed: Jun. 7, 1993

[51] Int. Cl.⁶ .................................................. G06F 15/46
[52] U.S. Cl. .............................. 395/24; 395/21; 395/23; 395/11; 395/25
[58] Field of Search ................................. 395/21, 23, 11, 395/24, 25

[56] References Cited

U.S. PATENT DOCUMENTS

| 4,660,166 | 4/1987 | Hopfield | 364/807 |
| 5,014,219 | 5/1991 | White | 395/11 |

OTHER PUBLICATIONS

J. J. Hopfield, "Neural Networks and Physical Systems with Emergent Collective Computational Abilities," Proc. Nat. Acad. Sci., USA, vol. 79, pp. 2254–2258, Apr. 1982.

R. J. McEliece, et al., "The Capacity of the Hopfield Associative Memory," IEEE Transactions on Information Theory, vol. T–33, pp. 461–482, 1987.

B. L. Montgomery et al., "Evaluation of the use of Hopfield Neural Network Model as a Nearest Neighbor–Neighbor Algorithm," Appl. Optics, vol. 25, No. 20, pp. 3759–3766, 1986.

M. Zak, "Terminal Attractors for Addressable Memory in Neural Networks," Phys. Lett. vol. A–133, pp. 18–22, Oct., 1988.

M. Zak, "Terminal Attractors in Neural Networks," Neural Networks, vol. 2, pp. 259–274, 1989.

H. K. Liu, et al., "Optical Implementation of Terminal Attractor Based Associative Memory," Appl. Opt., vol. 31, pp. 4631–4644, Aug. 10, 1992.

S. Y. Kung, et al., "An Optical Inner–Product Array Processor for Associative Retrieval," Proc. SPIE, vol. 613, pp. 214–219, 1986.

H. K. Liu et al., "Liquid Crystal Television Spatial Light Modulators," Appl. Opt., vol. 28, pp. 4772–4780, 1989.

J. S. Bayley et al., "On the use of the Hopfield model for optical pattern recognition," Opt. Commun., vol. 64, pp. 105–110, 1987.

G. R. Gindi et al., "Hopfield model associative memory with nonzero–diagonal terms in memory matrix," Appl. Opt., vol. 27, pp. 129–134, 1988.

H. K. Liu et al., "Inner–product optical neural processing and supervised learning," First Annual Conference of the International Neural Network Society, (INNS), Boston, Mass., Sep. 6–10, 1988.

(List continued on next page.)

*Primary Examiner*—George B. Davis
*Attorney, Agent, or Firm*—John H. Kusmiss

[57] ABSTRACT

A unipolar terminal-attractor based neural associative memory (TABAM) system with adaptive threshold for perfect convergence is presented. By adaptively setting the threshold values for the dynamic iteration for the unipolar binary neuron states with terminal-attractors for the purpose of reducing the spurious states in a Hopfield neural network for associative memory and using the inner-product approach, perfect convergence and correct retrieval is achieved. Simulation is completed with a small number of stored states (M) and a small number of neurons (N) but a large M/N ratio. An experiment with optical exclusive-OR logic operation using LCTV SLMs shows the feasibility of optoelectronic implementation of the models. A complete inner-product TABAM is implemented using a PC for calculation of adaptive threshold values to achieve a unipolar TABAM (UIT) in the case where there is no crosstalk, and a crosstalk model (CRIT) in the case where crosstalk corrupts the desired state.

12 Claims, 10 Drawing Sheets

OTHER PUBLICATIONS

F. J. Pineda, "Generalization of Back–Propagation to Recurrent Neural Networks," Physical Review Letters, The American Physical Society, vol. 59, No. 19, pp. 2229–2232, 1987.

N. H. Farhat, "Optoelectronic analogs of self–programming neural nets: architecture and methodologies for implementing fast stochastic learning by simulated annealing," App. Opts., vol. 26, No. 23, pp. 5093–5103, 1987.

Taiwei Lu, et al., "Optical Implementation of Programmable Neural Networks, Optical Pattern Recognition", H. Liu, ed., Proc. Soc. Photo–Opt. Instrum. Eng., vol. 1053, pp. 30–39, 1989.

D. Psaltis et al., "Optical information processing based on an associative–memory model of neural nets with thresholding and feedbck," Optics Letters, vol. 10, No. 2, pp. 98–100, 1985.

UNIPOLAR TERMINAL-ATTRACTOR BASED NEURAL ASSOCIATIVE MEMORY WITH ADAPTIVE THRESHOLD

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a neural associative memory system based on nonlinear, dynamical terminal attractors with adaptive threshold values for dynamic iteration of unipolar, binary neuron states.

BACKGROUND ART

One of the major applications of neural networks is in the area of associative memory. The avalanche of intensive research interests in neural networks was initiated by the work of J. J. Hopfield, "Neural Networks and Physical Systems with Emergent Collective Computational Abilities," Proc. Nat. Acad. Sci, U.S.A., Vol. 79 p. 2254–2258 (1982), U.S. Pat. No. 4,660,166 in which the associative memory is modeled with a neural synaptic interconnection matrix and encompasses an interesting computation scheme using recursiva, nonlinear thresholding. Further investigation reported by R. J. McEliece, E. C. Posner, E. R. Rodemich, S. S. Venkatesch, "The Capacity of the Hopfield Associative Memory," IEEE Transactions on Information Theory, Vol. T-33, pp. 461–482 (1987); and B. L. Montgomery and B. V. K. Vajaya Kumar, "Evaluation of the use of Hopfield Neural Network Model as a Nearest Neighbor Algorithm," Appl. Opt. Vol. 25, pp. 3759–3766 (1986) reveals that the storage capacity of the Hopfield Model is quite limited due to the number of spurious states and oscillations.

In order to alleviate the spurious states problems in the Hopfield model, the concept of terminal attractors was introduced by M. Zak, "Terminal Attractors for Addressable Memory in Neural Networks," Phys. Lett. Vol. A-133, pp. 18–22 (1988). However, the theory of the terminal-attractor based associative neural network model proposed by Zak determines that a new synapse matrix totally different from the Hopfield matrix is needed. This new matrix, which is very complex and time-consuming to compute, was proven to eliminate spurious states, increase the speed of convergence and control the basin of attraction. Zak (1988), supra, and M. Zak, "Terminal Attractors in Neural Networks," Neural Networks, Vol. 2, pp. 259–274 (1989).

Zak's derivation shows that the Hopfield matrix only works if all the stored states in the network are orthogonal. However, since the synapses have changed from those determined by Hebb's law, Zak's model is different from the Hopfield model, except for the dynamical iteration of the recall process. The improvement of the storage capacity of the Hopfield model by the terminal attractor cannot be determined based on Zak's model.

More recently, for the purpose of comparing the Hopfield model, both including and excluding a terminal attractor, a terminal-attractor based associative memory (TABAM) model has been proposed which incorporates binary neurons into the synaptic matrix determined by Hebb's law in the same way as the Hopfield model. That work has been disclosed in a paper by H. K. Liu, J. Barhen and N. H. Farhat, "Optical Implementation of Terminal Attractor Based Associative Memory," Appl. Opt., Vol. 31, pp. 4631–4644, Aug. 10, 1992, which by this reference is incorporated herein and made a part hereof. Among the several techniques proposed for optical implementation of the terminal attractor, the most important includes the application of the inner-product approach first proposed by S. Y. Kung and H. K. Liu, "An Optical Inner-Product Array Processor for Associative Retrieval," Proc. SPIE, Vol. 613, pp. 214–219 (1986) and later fully implemented by H. K. Liu, U.S. patent application Ser. No. 07/880,210 titled "Optical Inner-Product Neural Associative Memory," which by this reference is incorporated herein and made a part hereof. Also included among the several techniques proposed for optical implementation of the terminal attractor is the exclusive-or (XOR) operation of the liquid crystal television spatial light modulator (LCTV SLM) described by H. K. Liu and T. H. Chao, "Liquid Crystal Television Spatial Light Modulators," Appl. Opt., Vol. 28, pp. 4772–4780 (1989).

The complexity of the optical implementation of a TABAM is discussed in the 1992 paper by Liu, Barhen and Farhat. In general, optical implementation of subtraction increases the complexity of a TABAM system. Consequently, a unipolar neuron model, which has only 1 and 0 as binary states, instead of 1, 0 and −1 would be more suitable for implementation of a TABAM, but that would require optical implementation without subtraction or negative numbers normally encountered in a TABAM.

STATEMENT OF THE INVENTION

An object of this invention is to provide a TABAM system which, unlike the complex terminal attractor system of Zak, supra, is not defined by a continuous differential equation and therefore can be readily implemented optically.

A further object is to realize such a TABAM by an optical implementation of an inner-product neural associative memory.

Yet another object of this invention is to provide a unipolar inner-product TABAM (UIT) and a crosstalk reduced inner-product TABAM (CRIT). The UIT provides a thresholding means for implementation of a unipolar TABAM. The CRIT provides a means for transforming the input state vector into the correct basin of the stored vector; then it uses the terminal attractor to accelerate the convergence. In both the UIT and CRIT, a dynamical logistic function is provided for adaptive thresholding the output of each dynamical iteration of the recall process.

DETAILED DESCRIPTION OF THE INVENTION

Figure 1:
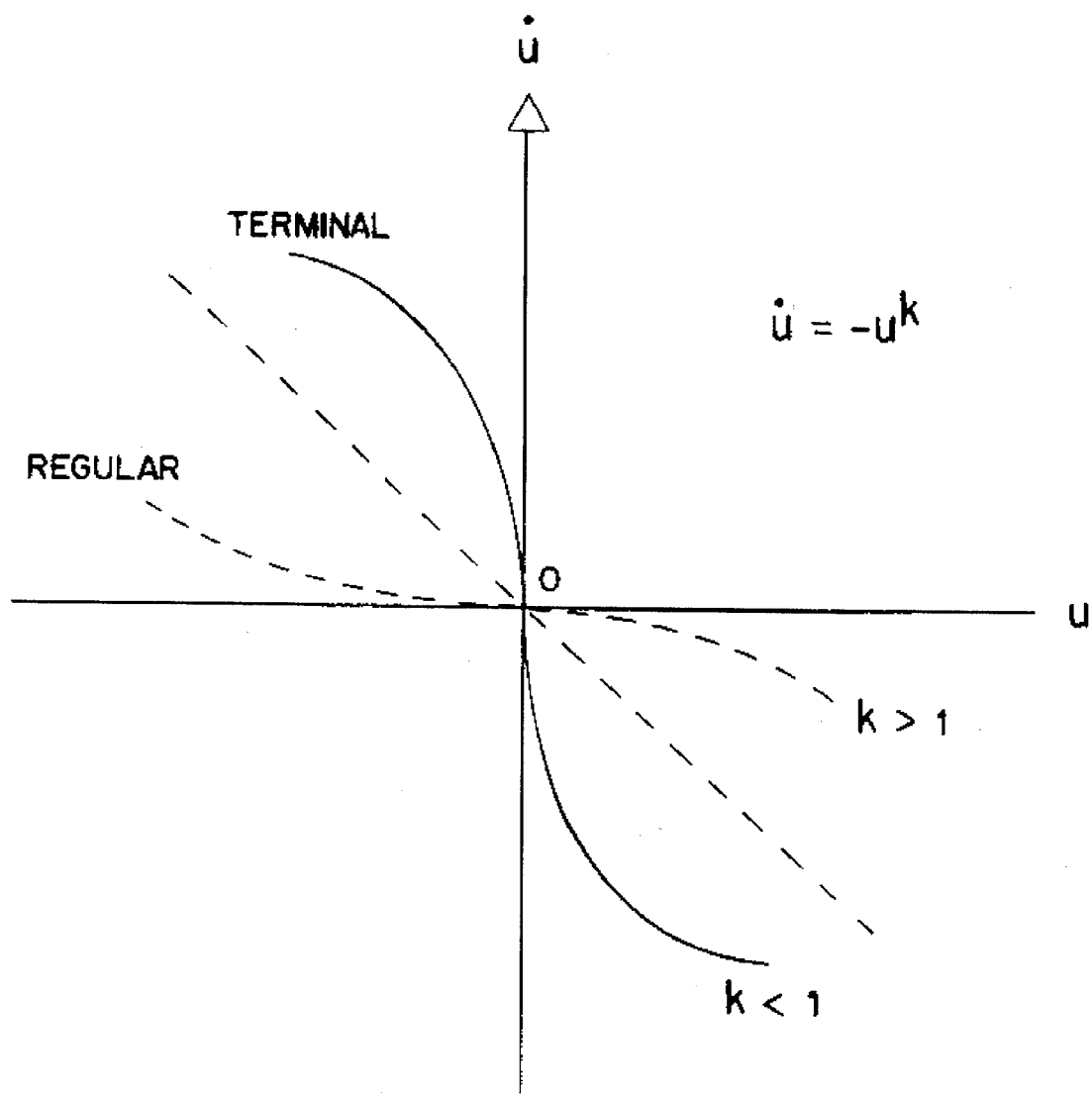
FIG. 1 is a plot of $\dot{u}=u^k$ to show phase flow in the neighborhood of regular and terminal attractors.

In the neural network associative memory model introduced by Hopfield, supra, the number of vectors that can be stored are limited. The capacity estimator by McEliece, supra, was based on the assumption that m of the randomly chosen n-tuple binary bipolar vectors are used for storage. When the network is probed by one of the possible n-tuple vectors which are less than a Hamming distance n/2 away from the fundamental memory, the maximum asymptotic value of m can be no more than n/(4 log n) as n approaches infinity.

The limitation of the capacity of the Hopfield model is partially due to the existence of spurious states. The spurious states arise in several forms. Most commonly seen spurious states are those stable states that are not originally stored. In terms of phase space terminology, these are false attractors trapped in the local minima in the energy landscape. Another problem is that there are states that are supposed to converge to certain stored states, but instead converge to other stored states that are more distant. Further, Montgomery and Kumar (1986), supra, pointed out the existence of oscillating states that also affect storage capacity. However, by letting the diagonal terms be naturally determined in the interconnection matrix instead of setting them to zero, the oscillating states mostly disappear. In addition, the model is found to be convenient for optical implementation. J. S. Bayley and M. A. Fiddy, "On the use of the Hopfield model for optical pattern recognition," Opt. Commun., Vol. 64, pp. 105–110, (1987); G. R. Gindi, A. F. Gmitro and K. Parthasarathy, "Hopfield model associative memory with nonzero-diagonal terms in memory matrix," Appl. Opt., Vol. 27, pp. 129–134 (1988); and H. K. Liu, T. H. Chao, J. Barhen and G. Bittner, "Inner-product optical neural processing and supervised learning," First Annual Conference of the International Neural Network Society (INNS), Boston, Mass., Sep. 6–10, 1988.

To increase the storage capacity of the neural network, one must reduce or eliminate the spurious states. A new type of attractor called a terminal attractor, which represents singular solutions of a neural dynamic system, was introduced by Zak (1988, 1989), supra, for the elimination of spurious states in the associative memory. These terminal attractors are characterized by having finite relaxation times, no spurious states, and infinite stability. They provide a means for real-time high-density associative memory applications and potential solutions for learning and global optimization problems.

The Zak terminal-attractor model assumed continuous variable representation of neural states in the neural dynamic equations. Also, sigmoidal thresholding functions were assumed. These assumptions present difficulties for optical implementations. To implement the terminal-attractor model, modifications to the basic Zak model are necessary.

The purpose of the following is to describe briefly the basic idea of terminal attractors, to modify these attractors for binary neural state representations for associative memory, and then to disclose relevant optical implementations.

I. Theoretical Discussions

In the following theoretical discussions, the basic characteristics of the terminal attractor is first briefly presented, and then it is shown how to apply the attractor to nonlinear neural dynamic systems.

A. Terminal Attractors vis-à-vis Regular Attractors

The concept of terminal attractors described by Zak (1988, 1989), supra, used a differential equation, $$\dot{u}=u^k. \tag{1}$$

It follows that $$\frac{d\dot{u}}{du} = -ku^{k-1}, \tag{2}$$

which is plotted in FIG. 1 with k as a parameter.

If k>1, $d\dot{u}/du=0$ as $u\to 0$, and u=0 is called a regular attractor. In contrast, if k=⅓, ⅕, ... 1/(2n+1), then $$\frac{d\dot{u}}{du} \to \infty \quad \text{as } u\to 0.$$

Therefore u=0 is called a terminal attractor, which is used to describe rapid convergence to an attractor point.

The relaxation time for a solution with the initial condition $u_0$ is $$\begin{aligned} t_0 &= \int_{u_0}^{u\to 0} (du/u^k) \\ &= -\left[\frac{u^{1-k}}{(1-k)}\right]_{u_0}^{u\to 0} \\ &= \frac{u_o^{1-k}}{(1-k)} - \lim_{u\to 0}\left[\frac{u^{1-k}}{1-k}\right] \end{aligned} \tag{3}$$

From Equation (3), it is seen that $t_0\to\infty$ as $u\to 0$ for k>1 and $$t_0 = \frac{u_0^{(1-k)}}{(1-k)}$$

for k=⅓, ⅕, ..., ½n+1) or simply for k<1 in general.

Figure 2A:
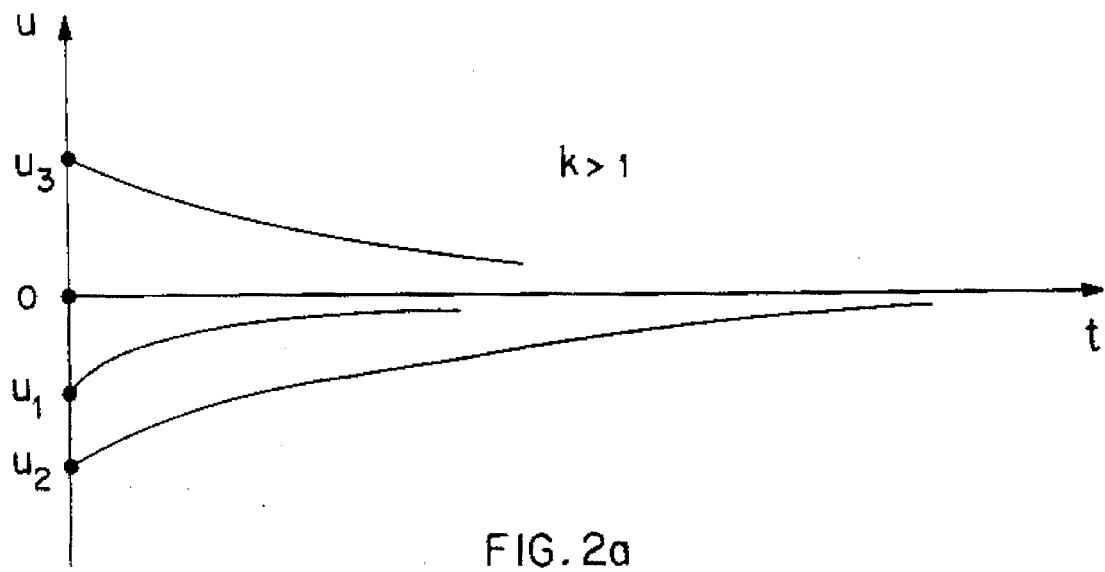
FIGS. 2a and 2b are respective plots of relaxation time, $t_i$, versus initial value of $u=u_i$ for regular and terminal attractors.
Figure 2B:
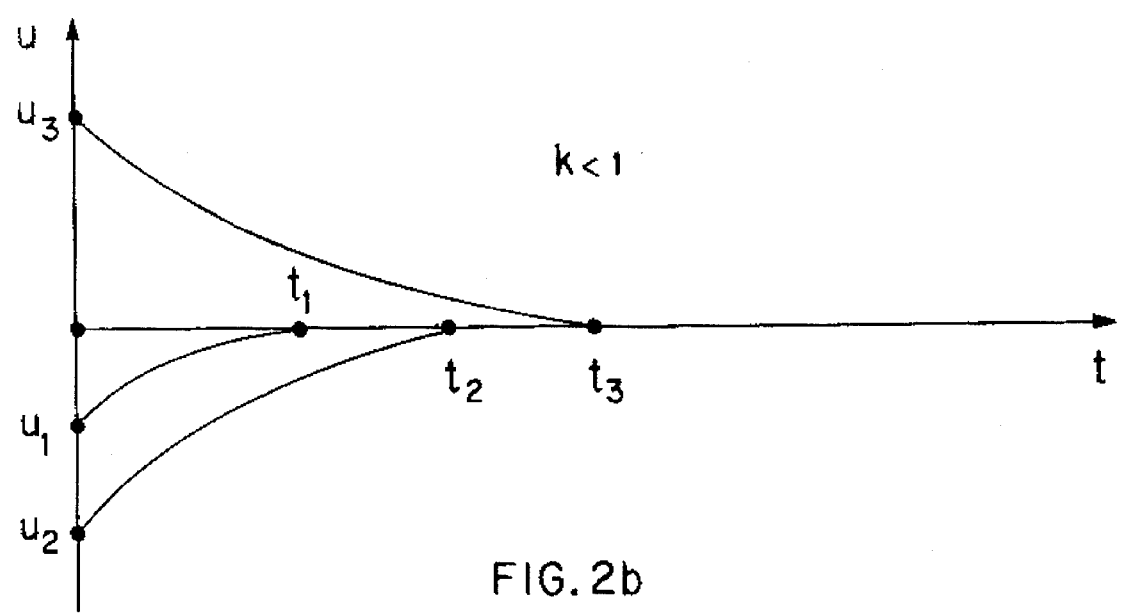

In FIGS. 2a and 2b, the relaxation time $t_i$ is plotted versus the initial values of $u=u_i$ for both the regular and the terminal attractors, respectively. It is clear that the relaxation time approaches infinity for the regular attractors, meaning that u never intersects the solution u=0. In contrast, for the terminal attractors, u(t=0)=$u_i$ decays to u=0 at t=$t_i$, u(t=0)=$u_2$ decays to 0 at t=$t_2$, and so on, all in finite times. This decay distinguishes the terminal attractors from the regular attractors. However, the Lipschitz condition for Equation (1) is violated for k<1, as is seen from Equation (3).

B. Terminal Attractors for Associative Memory

As just noted above, one of the fundamental problems of the Hopfield associative memory model is the existence of spurious states or the trapping of neural states in local energy minima of the phase space. For this reason, statistical mechanical models, such as simulated annealing, have been proposed to permit uphill jumps in the phase space so that the state of the network can be pumped out of the local minima in order that it eventually reach the global minimum. In spite of the fact that this is a slow procedure, it is useful for applications in solving optimization problems. Therefore, the following discussion is confined to the use of terminal attractors to solving associative memory neural networks.

Let $X=[x^m, m=1, \ldots M]$ denote a set of M linearly independent vectors in $R^N$; then assume that the neural network for the memorization of X is governed by the following nonlinear dynamic equation:

$$\dot{x}_i + a_i x_i = \sum_{j=1}^{N} T_{ij} g_j(x_j) - \sum_{m=1}^{M} \alpha_i^m (x_i - x_i^m)^k \times \exp[-\beta_i^m(x_i - x_i^m)^2], \quad (4)$$

where $a_i, \alpha_i^m$, and $\beta_i^m$ are positive constants and $k=(2n+1)^{-1}$ where $n \geq 1$. For simplicity and without losing generality, assume that $n=1$ and $k=\frac{1}{3}$ for the terminal attractor. The term $T_{ij}$ is the ith row and jth column element of the weight (synapse) matrix, and $g_i$ is a threshold function. A sigmoidal function is usually chosen for $g_i$ to satisfy the differentiability requirements for the continuous variables.

According to the work of Zak (1989), supra, the addition of the terminal attractor term in Equation (4) has to be based on the following conditions in nonlinear neural dynamics: (a) the Lipschitz condition at a fixed point is violated and (b) the Hopfield-type memory synaptic interconnection matrix is generally no longer valid unless the stored states are all mutually orthogonal. However, in the present invention, the Hopfield matrix is kept the same as that shown in Equation (4) for the following reasons. The exact reason for evoking the terminal attractor is to see whether the new term can improve the storage and retrieval capability of the neural system as compared with the system without the new term. If the memory matrix term in the model is changed, a highly sophisticated computation of the matrix itself must be made which, according to the theory derived by Zak, is just as complicated as the computation of the whole model. Hence, not only can optics hardly be made feasible for the implementation of the new model because nonlinear differential equations are involved, but also the impact of the terminal-attractor term on the Hopfield model cannot be determined because the new system is no longer related to a Hopfield neural network.

For optical implementation, there is already a large amount of research available that is based on the Hopfield model. The simple addition of the terminal-attractor term, as shown in Equation (4), represents a modification of the Hopfield model and the effort can therefore be focused on this part only. Nevertheless, the reason of expediency alone is insufficient because the basic theory is against such a simpler approach. To see whether the model of Equation (4) is justified, a computer simulation on the terminal-attractor based associative memory (TABAM) model was made with unipolar binary-neuron states and an adaptive threshold as described below. The computer-simulation results show that at least with a small number of neurons and with an almost equal number of stored states, perfect convergence to the correct stored states is achieved based on an exhaustive search with all possible input states and all combinations of possible stored states. In the computer simulation, the value of $n=1$ (and therefore $k=\frac{1}{3}$) was used for the terminal-attractor term. Because of the choice of a larger n, for different k values, the computation would be more complicated and the optical implementation more difficult. However, a larger number of neurons could be selected with mainframe computers for the simulation. The present simulation with $n=1$ offers sufficient reason to proceed with an optical implementation of the TABAM.

C. Binary-Data Representation for the TABAM

1. Basic Assumptions

In the hardware implementation of neural networks for associative memory, the input pattern and output pattern are usually represented in binary form. In the Hopfield model, bipolar binary representation is usually assumed, and so the stored vectors are given in binary form. However, in Equation (4) it has been assumed that the stored vectors have continuous values and that $g_j(x_j)$ also has continuous values, so modifications are required before this equation can be used for associative memory implementation. A modified model is given below.

Assume that a set of binary N-tuple vectors $V=\{v^m, m=1,2,\ldots,M\}$ are stored as terminal attractors in the neural net. The neural dynamics are described by $$\dot{x}_i + a_i x_i = \sum_{j=1}^{N} T_{ij} g(x_j) - \sum_{m=1}^{M} \alpha_i^m [g(x_i) - v_i^m]^{1/3} \times \exp\{-\beta_i^m [g(x_i) - v_i^m]\}. \quad (5)$$

Also assume the sigmoidal function:

$$g(x_j) = \tanh a x_j; \quad (6)$$

$\lim_{a \to \infty} g(x_j)$ is then a binary component.

2. Stability

The proof of stability of the binary-data-represented TABAM requires a linear approximation of Equation (5). The linearization is accomplished by a first-order approximation of a Taylor-series expansion:

$$\dot{x}_i + a_i x_i \cong T_{ii} v_i^m + \sum_{j \neq i}^{N} T_{ij} \lim_{a \to \infty} g(x_j) +$$

$$\lim_{a \to \infty} \frac{a T_{ij}}{\cosh^2 a x_i} (x_i - x_i^m) - \alpha_i^m \times$$

$$\exp\left\{-\beta_i^m \left[\lim_{\alpha \to \infty} g(x_i) - v_i^m\right]^2\right\} \times$$

$$\left\{\frac{1}{3}\left[\lim_{\alpha \to \infty} g(x_i) - v_i^m\right]^{-2/3} \times\right.$$

$$\left[\lim_{a \to \infty} \frac{1}{\cosh^2 a x_i}\right] - 2\beta_i^m \left[\lim_{a \to \infty} g(x_i) - v_i^m\right]^{4/3}\right\} \times$$

$$(x_i - x_i^m) - \sum_{m' \neq m}^{M} \alpha_i^{m'} \left\{\frac{1}{3}\left[\lim_{a \to \infty} g(x_i^m) - v_i^{m'}\right]^{-2/3} \times\right.$$

$$\lim_{a \to \infty} \frac{a}{\cosh^2 a x_i^m} - 2\beta_i^{m'} \times \left[\lim_{a \to \infty} g(x_i^m) - v_i^{m'}\right]^{4/3}\right\} \times$$

$$\exp[-\beta_i^{m'}(v_i^m - v_i^{m'})^2] \cdot (x_i - x_i^m). \quad (7)$$

Note that at $x_i = x_i^m$ and at $g(x_i) \to v_i^m$ as $a \to \infty$, $\dot{x}_i = (\infty) x_i + $ finite terms
Hence the system is infinitely stable at $x_i = x_i^m$.

D. Assumptions for the Optical Implementation of the Terminal-Attractor Based Associative Memory The above proof of stability for the binary-number-represented terminal-attractor based neural dynamic system is essential before hardware implementation is considered. Further assumptions will be required for the optical implementation of the TABAM.

These assumptions are related to the determination of the values of $T_{ij}$, $\alpha^m$, $\beta^m$, and the threshold used in the function g( ) in Equations (5) and (6).

First we discuss $T_{ij}$. The simplest assumption is that $T_{ij}$ may follow Hebb's rule used in the Hopfield model:

$$T_{ij} = \sum_{m=1}^{M} v_i^m v_j^m. \tag{8}$$

When this term was used in the Hopfield model, spurious states were found. For the sake of comparing the effects of the reduction of spurious states in the TABAM on the same basis, the same assumption should be kept. Other learning rules may be used with the TABAM for $T_{ij}$, such as the one suggested by F. J. Pineda, "Generalization of back-propagation to recurrent neural networks," Phys. Rev. Lett., Vol. 59, pp. 2229–2232 (1987). However these $T_{ij}$'s will require extensive computations by digital computer as well as a decision on whether the spurious states exist in these models when the terminal attractors are not invoked. Therefore, the following discussion leaves the options of the selections of $T_{ij}$ open for any future implementation schemes.

The purpose of $\beta_i^m$ and the exponential term in the terminal attractor is to provide a Gaussian distribution peaked at $g(x_i) = v_i^m$. When $g(x_i)$ moves away from $v_i$, the exponential function decays to zero. This term maximizes the influence of the terminal attractor for $g(x_i)$ that approaches $v_i^m$. However, it also adds complication and difficulty to optical implementations.

If $\beta_i^m = 0$, the exponential term becomes 1. This is equivalent to stating that $g(x_i) = V_i^m$ for all m. This is obviously impossible unless there is only one stored state, i.e., $M=1$. Therefore, $\beta_i^m > 0$.

One way of determining the parameter $\alpha_i^m$ is given as follows. In the Hopfield model, the activation-potential component $x_i$ in the iteration is given by:

$$\begin{aligned} x_i' &= \sum_{j=1}^{N} T_{ij} g(x_j) \\ &= \sum_{j=1}^{N} \sum_{m=1}^{M} v_i^m v_j^m g(x_j). \end{aligned} \tag{9}$$

One may rearrange the terms and obtain an inner-product formalism of this model by letting $$\begin{aligned} x_i' &= \sum_{m=1}^{M} v_i^m \sum_{j=1}^{N} v_j^m g(x_j) \\ &= \sum_{m=1}^{M} \alpha_m v_i^m \end{aligned} \tag{10}$$

where $$\alpha^m = \sum_{j=1}^{N} v_j^m g(x_j),$$

which is the inner product between one of the stored vectors and the computed vector. The parameter is a measure of the degree of similarity between the computed vector and one of the stored vectors.

To emphasize the impact of the terminal attractor represented by a stored vector that is most similar to the computed vector during iteration, it is suggested that the parameter $\alpha_i^m$ be chosen as $$\alpha_i^m = \alpha^m, i=1, \ldots, N. \tag{11}$$

With this choice, the stability of the dynamic system is not affected because the term leading to infinity at $g(x_i) = v_i^m$ is not changed. With this selection of parameters and without loss of generality by letting $\alpha_i = 1$ at steady state ($\dot{x}_i = 0$), Equation (5) may then be written as $$\begin{aligned} x_i' &= \sum_{j=1}^{N} T_{ij} g(x_j) - \sum_{m=1}^{M} \alpha^m [g(x_i) - v_i^m]^{1/3} \times \\ &\quad \exp\{-\beta_i^m [g(x_i) - v_i^m]^2\} \\ &= \sum_{j=1}^{N} T_{ij} g(x_j) + I_i \end{aligned} \tag{12}$$

$$I_i = \sum_{m=1}^{M} \alpha^m [g(x_i) - v_i^m]^{1/3} \exp\{-\beta_i^m [g(x_i) - v_i^m]^2\}.$$

Equation (12) is generic in the sense that $T_{ij}$ is not specified.

In the following discussion, further approximations are made and a simpler model that is more viable for optical implementations is derived. Assume that the Hebbian rule as shown in Equation (8) is used for $T_{ij}$. Then based on Equations (10) and (11), Equation (12) may be written as $$x_i' = \sum_{m=1}^{M} \alpha^m v_i^m - \sum_{m=1}^{M} \alpha^m [g(x_i) - v_i^m]^{1/3} \times \tag{13}$$

$$\exp\{-\beta_i^m [g(x_i) - v_i^m]^2\}.$$

$\beta_i^m$ will now be considered. In the same spirit of determining $\alpha_i^m$, it is assumed that the exponential term in Equation (13) may be set in a collective manner:

$$\exp\{-\beta_i^m [g(x_i) - v_i^m]^2\} \to \exp\left\{ -\beta^m \sum_{i=1}^{N} [g(x_i) - v_i^m]^2 \right\},$$

$\beta_i^m = \beta^m = $ a constant

In addition, if it is assumed that unipolar binary numbers are used for the neuron-state vectors, the factor of ⅓ in the exponential term of Equation (13) may be dropped without changing the value of the equation.

Equation (13) may then be written as $$x_i = \sum_{m=1}^{M} \alpha^m v_i^m + \sum_{m=1}^{M} \alpha^m \exp\left\{ -\beta^m \sum_{i=1}^{N} [g(x_i) - v_i^m]^2 \right\} \times \tag{14}$$

$$[v_i^m - g(x_i)].$$

In terms of vector representation, Equation (14) may be written as $$X' = \sum_{m=1}^{M} [V^m \cdot g(X)] \times \tag{15}$$

$$(V^m + \{\exp[-\beta^m | V^m - g(X)|^2]\}[V^m - g(X)]),$$

where X' is the updated neuron activation-potential vector and g(X) is a thresholded vector where the function g is applied to every term of X in taking the threshold.

Equation (15) involves the inner product of $V^m$ and g(X) and the subtraction between $V^m$ and g(X), but it is only valid for unipolar binary representation of the vectors. This will be noted again in the discussion below of a unipolar TABAM with adaptive threshold and perfect convergence.

The convergence of the iteration not only depends on the data representation, the number and the content of the stored vectors, the initial input, the synapses, and the parameters $\alpha^m$ and $\beta^m$, but also critically depends on the thresholding value in the function g. In binary-state representations, it is most convenient to use the sigmoidal function as the thresholding function, but it can be shown that convergence depends on the threshold. Unfortunately, it is quite difficult to determine the threshold value based on rigorous analytical results. Therefore, with the assistance of computer simulation, the empirical method will be used for the selection of the threshold.

II. Optical Implementation of the Terminal-Attractor-Based Associative Memory [TABAM]

Two types of optical architectures for the implementation of the TABAM will now be discussed. One type is based on the multiplication of a one-dimensional input vector with a two-dimensional matrix; the other uses two-dimensional input vectors. The architectures described are based on state-of-the-art optics and electronics hardware described by, for example, N. H. Farhat, "Optoelectronic analogs of self-programming neural nets," Appl. Opt., Vol. 26, pp. 5093–5103 (1987)]

A. Optical TABAM with One-Dimensional Input Neuron-State Vectors

Figure 3:
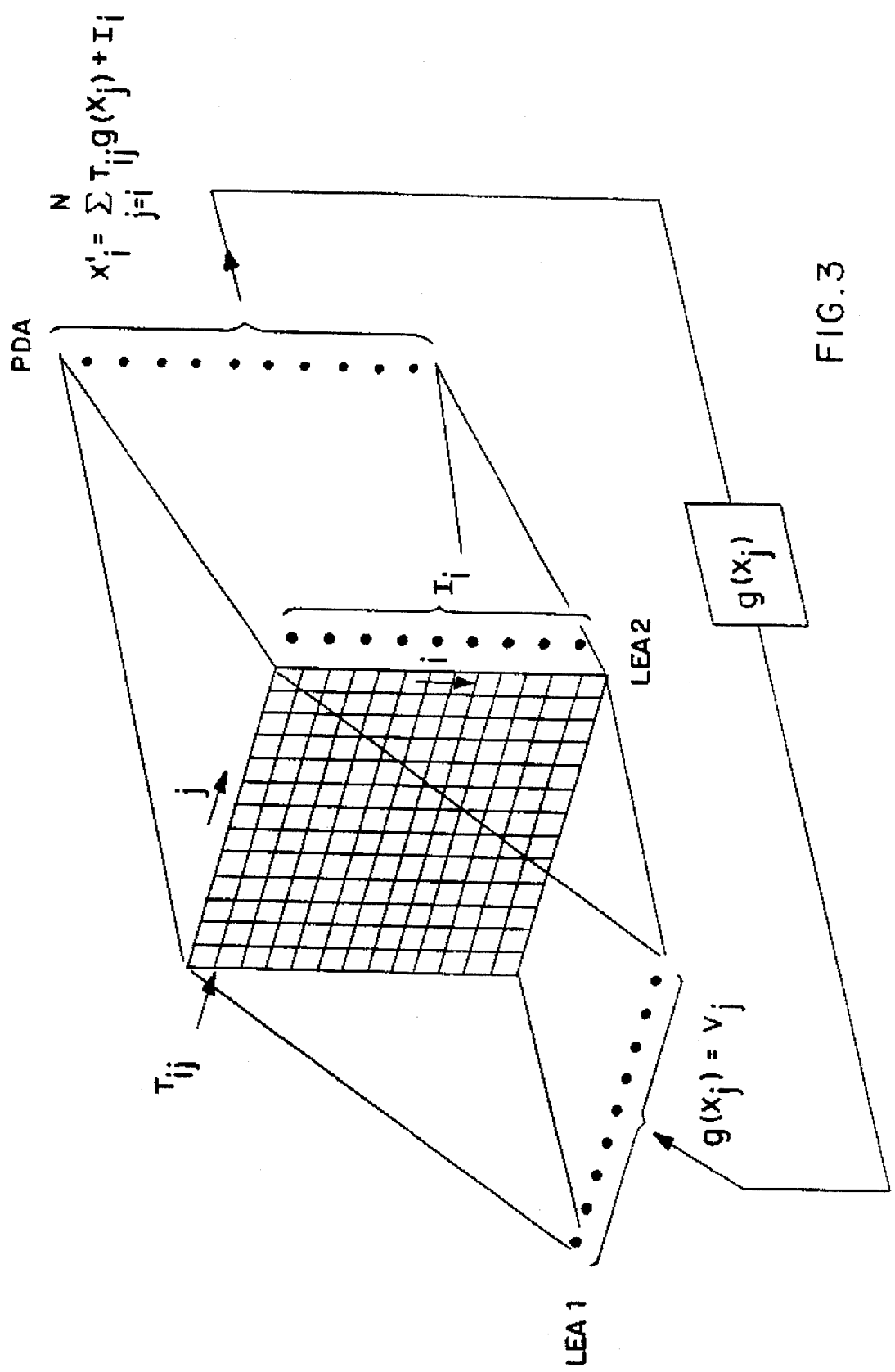
FIG. 3 is a diagram for the architecture of a terminal-attractor based neural network using a photodetector array PDA, a sigmoidal function $g(x_i)$ and a connectivity mask $T_{ij}$.

If the input vectors are in one-dimensional form, a reasonable approach to hardware verification of the TABAM is shown in FIG. 3. Theoretically, the terminal-attractor term $I_i$ of Equation (12) may be represented by the light-emitting diode array LEA2, and the one-dimensional input vector $v_i$ is applied by the light-emitting diode array LEA1 represented by a row of dots, one dot for each diode. The indices i and j run from 1 to N. These LEA's may be replaced by acousto-optic cells with coherent illumination. The output is precisely as given by Equation (12).

Figure 4A:
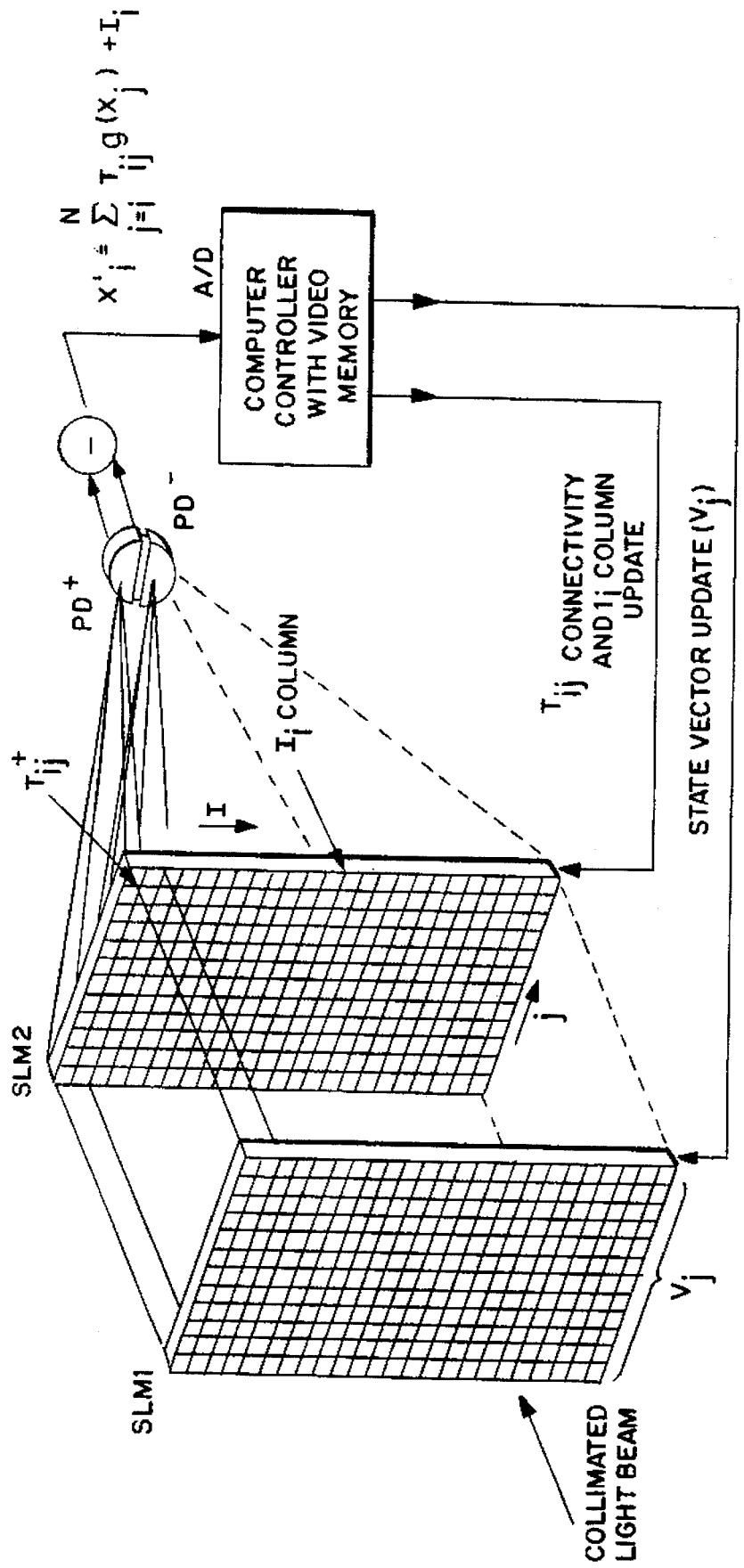
FIGS. 4a and 4b illustrate diagrammatically the architecture for two optoelectronic neural networks employing electronically addressable and programmable spatial light modulators (SLM) panels for TABAM implementation with one-dimensional input.
Figure 4B:
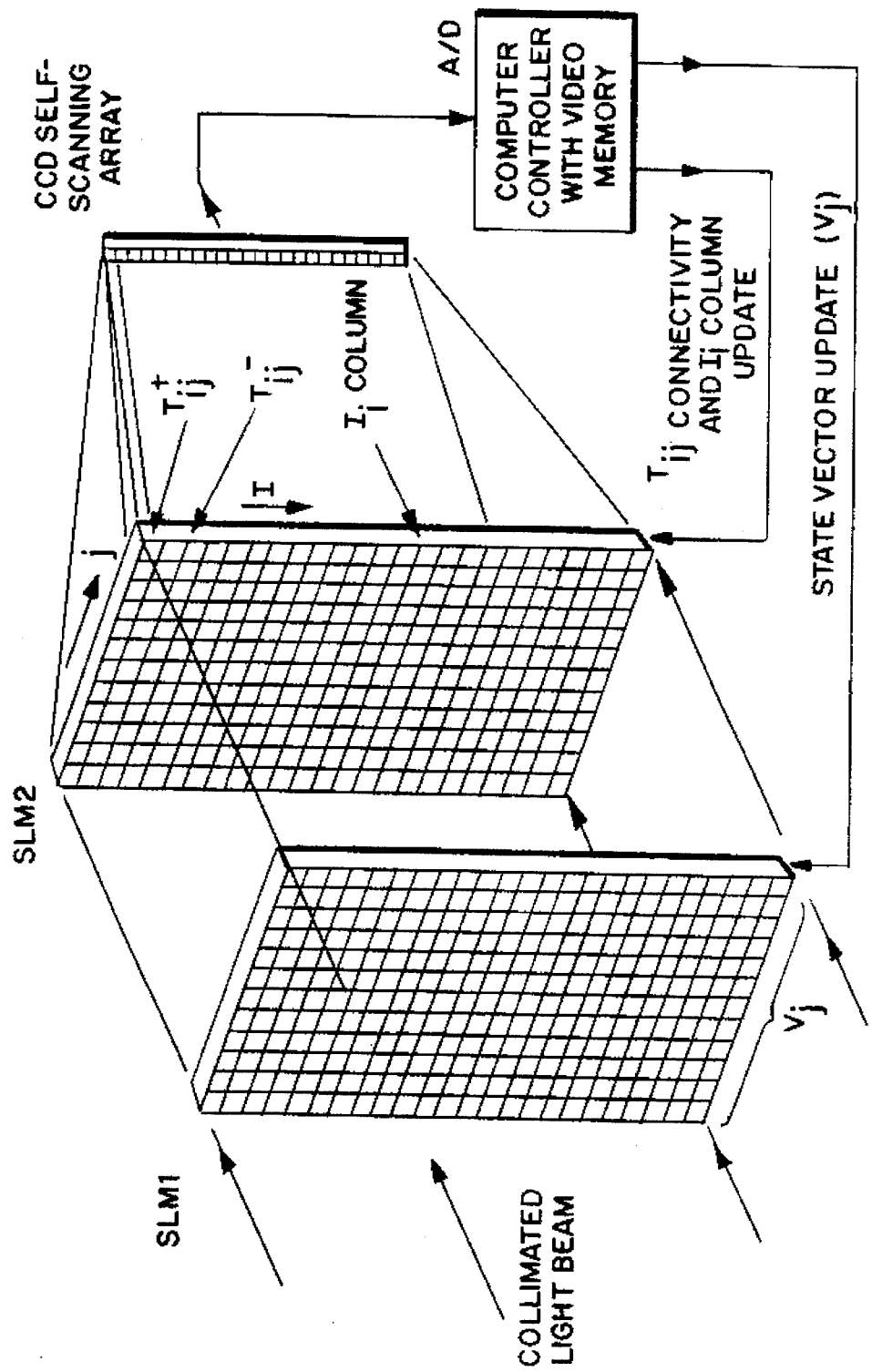

Two embodiments of an alternative implementation of the TABAM are shown in FIGS. 4a and 4b. In FIG. 4a, two light (charge) integrating photodetectors $PD^+$ and $PD^-$ are connected to a differential amplifier DA to provide the output $X'_i$. Both spatial light modulators SLM1 and SLM2 are liquid crystal TV (LCTV) panels electronically addressable and programmable with SLM2 displaying ternary connectivity mask $T_{ij}$. It should be noted that SLM1 is shown with a first vector stored on the top two rows and subsequent vectors stored on succeeding pairs of rows, and that of the top row in each pair of rows is focused onto the photodetector $PD^+$ and the bottom row onto the photodetector $PD^-$. The reasons for this will become apparent from the description of operation below.

In FIG. 4b implementation is the same except a self-scanning charge-coupled device array CCD is used with odd-even photosite outputs for the output $X'_i$. The advantage of this CCD for the output $X'_i$ will be evident from the description of operation below.

Thus, in FIGS. 4a and 4b, two electronically addressed spatial light modulators (SLMs) designated SLM1 and SLM2 are used to represent the state vector $v(j,j=1,2 \ldots N)$ and the connectivity matrix $T_{ij}(i,j=1,2 \ldots N)$ respectively, with N being the number of neurons in the network. One column on the SLM2 is used for the input of $I_i$, which is calculated by a computer. Assume that both SLMs can be refreshed at a video rate from at least one computer controller CC with video memory. The two SLMs are identical and are deployed in tandem (proximity coupled) by aligning them so that pixels are in perfect registration. By using collimated spatially incoherent light for the illumination, multiplication of the transmittance patterns stored in the two SLMs is achieved. A coherent fiber-optic faceplate can also be used to proximity couple the two SLMs to minimize crosstalk between pixels if this process proves to be problematic.

The state-of-the-art commercial SLMs, such as the liquid-crystal TV (LCTV) spatial light modulator, are available with approximately 200×200 pixels and an achievable contrast of at least 30:1 on a rectangular grid format. This availability permits the construction of neural network modules with an order of 100 neurons in these architectures. Larger neural networks can be formed by clustering several such modules. Clustering is expected to lead to some sacrifice in overall speed, but this may be an acceptable price to pay for the advantage of being able to form flexible neural networks of a few hundred to a thousand neurons with available SLM technology.

In addition to the LCTV SLMs mentioned above, other SLMs are also commercially available. A promising candidate for the electronically addressable SLM in these architectures is the Semetex 256×256 pixel magneto-optic SLM (MOSLM). A minimum contrast ratio of 10000:1 has been reported for the MOSLM. Another device that has recently become available is the ferroelectric liquid-crystal SLM, which has 128×128 pixels, 100-Hz driving speed, and a contrast ratio greater than 100:1. However, all of these devices except the LCTV SLM are basically binary or trinary in nature. If multiple values of the interconnection-matrix component are to be represented, quantization would be needed. In that case, more pixels would be required to represent one analog value, and the total number of neurons that can be processed would be reduced. The main drawback of the LCTV SLM is its limited dynamic range and contrast ratio. However, the combination of thin-film transistor technology with special waveforms for driving pixels in the LCTV SLMs has resulted in improved contrast and dynamic range levels that are more suitable for realizing the $T_{ij}$ matrix in these architectures.

In the hardware operation, two LCTV SLMs (or MOSLMs) or ferroelectric liquid-crystal SLMs can be used in the first embodiment of FIG. 4a to realize a neural network of approximately 60 neurons. The state vectors are displayed on SLM1 in such a way that each element of the unipolar binary-state vector $v_j$, $j=1,2 \ldots N$ where N=60 is assigned to four adjacent pixels in two adjacent rows of SLM1. The vector $v_j$ is displayed by using the two top rows to obtain the activation potential of the first neuron in the network. If the LCTV is used, its large composite pixel size has the advantage of making alignment easy, thus minimizing diffraction by pixels. Therefore, crosstalk is reduced between pixels in the event that proximity coupling of SLM1 to SLM2 is chosen in the implementation. (Otherwise, an imaging lens can be used for the multiplication.)

SLM2 is used to display the connectivity weights in the geometry shown. It is assumed that the dynamic range of the SLM is sufficient to accommodate the spread in weight values, which for the Hopfield-type of storage ranges between −M and +M where M is the number of entities. The bipolar values of the connectivity matrix are encoded by assigning positive values to one row of SLM2 and negative values to the adjacent row. The terminal-attractor term $I_i$ is first computed in accordance with Equation (12) and then applied to the far-right column of SLM2. Light emerging from these rows is focused with the aid of appropriate optics (not shown) onto photodetectors $PD^+$ and $PD^-$ in such a way that $PD^+$ collects light emerging from the positive row and $PD^-$ collects light emerging from the negative row of $T_{ij}$. The photodetectors $PD^+$ and $PD^-$ are followed by the differential amplifier DA comprising two charge-integrating amplifiers whose outputs are subtracted before the difference is sampled and stored by the computer controller CC through its analog-to-digital converter port. The outputs can be subtracted at the instant the writing of the first two rows of SLM1 and SLM2 is completed or at the end of writing one complete frame in SLM1 and SLM2. This subtraction ensures that the quantity sampled by the computer is the activation potential of the first neuron:

$$x_i' = \sum_{j=1}^{N} T_{ij}v_j + I_i, \quad i=1. \tag{16}$$

To sample and store the activation potential of all other neurons in the net, the position of the two rows of SLM1 on which $v_j$ is displayed is lowered in steps of two rows during each frame or display of $v_j$, $T_{ij}$ is also displayed on SLM2 and the activation potential is measured and stored as previously described. In this fashion, and as the $v_j$ display is moved from the top two rows to the bottom two rows of SLM1, the activation potentials for all N neurons are sequentially generated, sampled, and stored by the computer-controller. The time needed to accumulate the activation-potential vector for these N neurons equals N times the frame time of the SLMs. For the LCTV SLM, the time is N×30 ms or 1.8 s. Once the activation-potential vector x' is measured, the computer-controller CC computes the updated state vector for the neural network:

$$v_i^{(q+1)} = g\{x_i'^{(q)}\}\ i=1,2,\ldots N, q=0,1,2,3\ldots, \tag{17}$$

where $g\{x_i'^{(q)}\}$ designates the sigmoidal function of the bracketed quantity. The updated state vector is used next with the same procedure for generating the activation-potential vector described above to obtain a new state vector and so on. The above process is repeated until the state vector converged to a stable state. When this happens, the state vector of the neural network in phase space or configuration space is said to have converged to an attractor of the neural network.

Before describing the second embodiment of FIG. 4b, note that the charge-integrating amplifiers in the first implementation may not be required because of the long pixel-relaxation time of the SLM, which is typically of an order of 10 ms but can be as high as 100 ms in some devices. Thus, in this case photodetectors PD$^+$ and PD$^-$ measure the activation potential directly without the need of a time-integration device, thereby simplifying the implementation process. Addition simplification would be to present outputs of PD$^+$ and PD$^-$ directly to the computer-controller where each is separately converted from analog to digital form before the computer-controller carries out the subtraction.

To speed up the operation and convergence time in the first embodiment, it is possible to modify the architecture as shown in FIG. 4b. In this embodiment, a self-scanning CCD is used as a PD array to measure the activation-potential vector in one video frame time instead of the N frame times needed for the first scheme. An N time-speed enhancement is therefore achieved, which assumes that the CCD PD array can be read out in one video frame time or less. CCD PD arrays are available with bandwidths of 20 MHz or more. This availability means that a device with 120 photosites each receiving light focused from the 120 rows of the $T_{ij}$ in SLM2 of the first embodiment can be read in 6 µs or less, which is considerably shorter than the 30 ms frame time of the utilized SLMs. The state-update time of this scheme would therefore be primarily limited by the frame time of the SLMs used, or 30 Hz for the LCTV SLM. Note that CCD photosensor arrays with a separate even photosite read-out, such as that of the Recticon CCD arrays, are commercially available. This readout feature would facilitate subtracting the outputs of positive and negative photosite pairs to obtain the activation potential of the neuron.

B. Optical TABAM with Two-Dimensional Input Neuron-State Vectors

On one hand, architectures with one-dimensional input neuron-state vectors are useful for the processing of signals that are originally presented in one-dimensional form, such as radar, sonar, or seismic wave data. Optical images, on the other hand, are normally received in two-dimensional form. Although two-dimensional images can be converted by raster scanning to one-dimensional signals before processing, a two-dimensional reconstruction is then required to restore the image after processing. The processes must have additional processing time and hardware. For this reason, two architectures of the TABAM for processing two-dimensional input neuron-state vectors are proposed as follows.

$N^4$ to $N^2$ Interconnection Architecture

When the input neuron-state vectors are represented by a two-dimensional form of $N^2$ pixels, the interconnection matrix requires $N^4$ pixels. In this case, Equation (12) is modified as $$X_{ij} = \sum_{k=1}^{N} \sum_{l=1}^{N} T_{ijkl} g(x_{kl}) - \sum_{m=1}^{M} \alpha^m [g(x_{ij}) - v_{ij}^m]^{1/3} - \exp\{\beta_{ij}^m [g(x_{ij}) - v_{ij}^m]^2\}, \tag{18}$$

where $g(x_{ij})$ denotes a threshold ith row and jth column component of a neuron-state vector arranged in a two-dimensional matrix, and $T_{ijkl}$ represents a component of the $N^4$ interconnection matrix.

Figure 5:
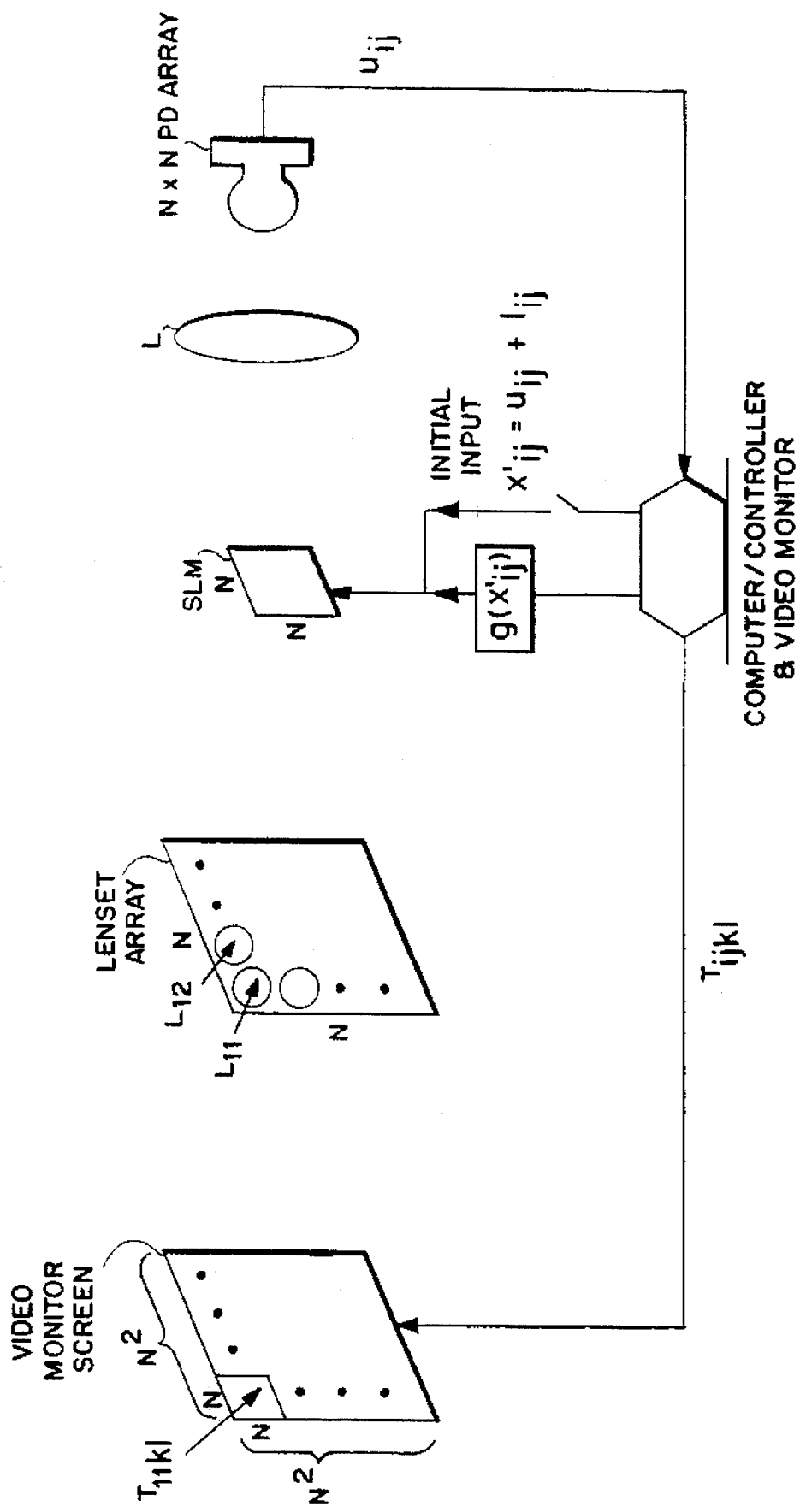
FIG. 5 is a schematic diagram of an optoelectronic implementation of a TABAM with two-dimensional input neuron-state vectors.

Recently a $N^4$ to $N^2$ architecture was discovered and experimentally demonstrated by T. Lu, S. W, X. Xu and F.T.S. Yu, "Optical implementation of programmable neural networks," Optical Pattern Recognition, H. Liu, ed., Proc. Soc. Photo-Opt. Instrum. Eng., Vol. 1053, pp. 30–39 (1989). This architecture can be modified to implement the TABAM with a two-dimensional input. As shown diagrammatically in FIG. 5, the weight matrix is presented in an N×N array with elements $T_{11\ kl}$, $T_{12\ kl}$, ... $T_{21\ kl}$, $T_{22\ kl}$ ... $T_{nn\ kl}$, each of which also has N×N pixels. The input neuron-state vector is represented by an SLM with N×N pixels. The interconnection between the weight matrices and the input state is accomplished through the lenslet array $L_{11}$, $L_{12}$, and so on, where $L_{11}$ connects $T_{11\ kl}$ to the input, and so on.

The terminal-attractor term $I_{ij}$ is computed by a digital computer and added to the output term detected by the N×N PD array. The sum is thresholded before it is applied to the input SLM. The system can be activated with any initial input vector.

If a commercially available video monitor with 1024×1024 pixels is used fore the weight matrix, a maximum of 32×32 neurons can be processed. The advantage of the system is the dynamic range and number of gray levels (256) available in the video monitor.

Inner-Product Architecture

An optical inner-product approach for neural processing was proposed earlier by S. Y. Kung and H. K. Liu, supra, and fully implemented by H. K. Liu, patent application Ser. No. 07/880,210 as noted hereinbefore.

Before describing the inner-product approach, the outer-product approach will first be briefly described for contrast. Assume that an integral number M of N-tuple binary vectors $V_i (i=1, \ldots M)$ are stored in a system where M<<N.

A computation model with iteration, thresholding and feedback for the associative retrieval of any one of the stored vectors by an arbitrary input vector was proposed by J. J. Hopfield (1982), supra. In the Hopfield model, the vectors are stored in an outer-product matrix:

$$W = \sum_{i=1}^{M} V_i V_i^t$$

where t denotes the transpose of the vector $V_i$.

In the recall process, an arbitrary input vector V is assumed, and the following steps are followed:

Step (1): Vector-matrix multiplication:

$$W V = Z$$

Step (2): Thresholding by an operator $\theta$:

$$V^* = T \theta[Z]$$

Step (3): Iteration:

Replace the input vector V in Step (1) by $V^*$ and repeat until convergence is reached. The $V^*$ at that time is the correct output vector.

An optical implementation of the outer-product process was first demonstrated by Psaltis and Farhat, "Optical Information Based on an Associative Memory Model of Neural Nets with Thresholding and Feedback," Optics. Lett., Vol. 10, page 98, et seq., (1985).

In contrast to the outer-product approach, the steps of the inner-product operation are:

Step (1): Compute a vector-vector inner product scalar $\alpha$:

$$\alpha_i = V_i^t V$$

where $V_i^t$ is the ith stored vector, i=1, ... ,M, and V is the input vector.

Step (2): Weighting:

$$Y_i = \alpha_i V_i$$

Step (3): Vector summation:

$$Z = \sum_{i=1}^{M} Y_i$$

Step (4): Thresholding by an operator $\theta$:

Step (5): Iteration: accomplished by substituting the threshold Z of Step (3) for the input vector V and repeat.

The thresholding and iteration operations are similar to those described in the outer-product process. Since the process involves basically the inner-product between the input vector and the M stored vectors, this process is called an inner-product model. An optical implementation of the inner-product model is discussed below as an example of this invention.

Figure 6:
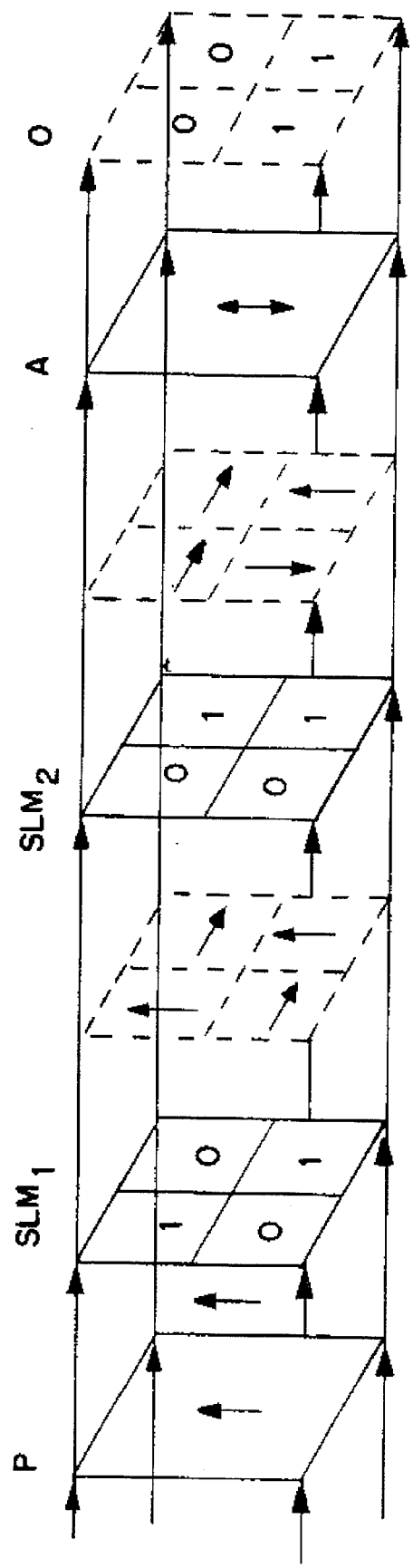
FIG. 6 illustrates diagrammatically the inner-product operation using two transmissive liquid-crystal SLMs.

By using Equation (15) it is possible to implement the TABAM based on the inner-product approach as shown in FIG. 6, which will be described in detail following an experimental set-up shown in FIG. 10. In this case, the weight matrix does not have to be precalculated because no weight matrix is used. The lack of the explicit expression of the synapses makes this approach different from the conventional concept of a neuron network. Nevertheless, both analysis and computer-simulation results show that the inner-product and outer-product of the Hopfield model are equivalent if in the latter model the weight matrix is not thresholded and the diagonal terms are not set to zero.

One practical advantage of the inner-product approach is that with the same space-bandwidth product capacity of SLMs, the inner-product computation allows processing many more neurons than the outer-product computation of the Hopfield model where vector-matrix multiplication is performed. In contrast, some learning algorithms such as the error backpropagation for distributed weight correction cannot be applied because of the nonexistence of a weight matrix.

Attention is now called to the implementation of the approximated model based on Equation (15). From an optics point of view, the exponentiation and subtraction shown in the equation are difficult to implement. In the optoelectronics approach, these two operations can best be handled by electronics. For easier implementation, Equation (15) should be treated further. It is rewritten as follows:

$$X = \sum_{m=1}^{M} [V^m \cdot g(X)]\{1 + \exp[-\beta^m |V^m - g(X)|^2]\}V^m - \sum_{m=1}^{M} V^m \cdot g(X)\exp[-\beta^m |V^m - g(X)|^2]g(X). \quad (19)$$

Equation (19) contains two types of operations, namely the inner-product operation and the exclusive-OR operation between $V^m$ and g(X). In addition, for unipolar positive binary representation, it is shown that $$|V^m - g(X)| \equiv |V^m - G(X)|^2$$

in each of their components.

In an optical implementation based on the use of the LCTV SLM, i.e., based on the rotation of the polarization orientation of the input light by the twisted nematic effect of the liquid-crystal molecules in the SLM cell, by appropriately orienting the input and output polarizers, the inner product and the exclusive-OR between two inputs can be obtained. FIG. 6 depicts the inner-product operation. The first and second inputs are written on SLM1 and SLM2, respectively. For simplicity, only four cells are shown in this discussion. A numeral 1 shown on the cell means that the liquid-crystal molecules will not rotate the polarization orientation of the light passing through it. A numeral 0 shown on the cell means that the liquid-crystal molecules will rotate the polarization of the light passing through it by 90° (in an ideal case). The arrows in space represent the orientation of the polarization of light. Under the conditions shown in the figure, when the polarizer P and analyzer A are oriented vertically and in parallel, the inner product between the first input and the second input results as shown in Table 1.

TABLE 1

| Truth Table for an Inner Product Using the Polarization Effects in a Liquid-Crystal SLM | | |
|---|---|---|
| Input 1 | Input 2 | Output |
| 1 | 0 | 0 |
| 0 | 1 | 0 |
| 1 | 1 | 1 |
| 0 | 0 | 1 |

Notice in Table 1 that 0×0=1 in the unipolar case is equivalent to −1×−1=1 in the bipolar case. Because of this result, the operation is equivalent to the inner product between the two inputs, which is a measure of the degree of resemblance of the two inputs. In contrast, if the analyzer of FIG. 6 is oriented perpendicular to the polarizer, an exclusive-OR operation between the two inputs results. This relationship establishes $$|input1 - input2| = 1 - (input1) \cdot (input2), \quad (20)$$

where the multiplication dot denotes the inner product.

Taking advantage of Equation (20), Equation (19) may be rewritten as $$X' = \sum_{m=1}^{M} [V^m \cdot g(X)](1 + \exp\{-\beta^m[N - V^m \cdot g(X)]\})V^m - \qquad (21)$$
$$\sum_{m=1}^{M} [V^m \cdot g(X)]\exp\{-\beta^m[N - V^m \cdot g(X)]\}g(X)$$
$$= \sum_{m=1}^{M} \alpha^m\{1 + \exp[-\beta^m(N - \alpha^m(N - \alpha^m)]\}V^m -$$
$$\sum_{m=1}^{M} \alpha^m \exp[-\beta^m(N - \alpha^m)]g(X),$$

where $\alpha^m = V^m \cdot g(X)$ and $N$ is the maximum value of $V^m \cdot g(X)$. Let $$\alpha^m \exp[-\beta^m(N-\alpha^m)] = \gamma^m, \qquad (22)$$

then $$X' = \sum_{m=1}^{M} [(\alpha^m + \gamma^m)V^m - \gamma^m g(X)]. \qquad (23)$$

In considering the optical implementation of Equation (23) there are two challenging problems. The first is the realization of the exponential and subtraction parts in Equation (22). The second is the performance of the subtraction in Equation (23). Because the first operation is a scalar-value operation, it is feasible to simply let a digital computer such as a personal computer (PC) perform the subtraction.

The subtraction in Equation (23) can be carried out much faster if it can be done optically in parallel. The condition under which that subtraction can be performed optically in parallel will now be explored. By examining Equation (23) it is found that the result of the computation is normally greater than 1 and may be less than 0 in some cases, such as when a specific component of the stored vector is always 0 but the corresponding component of g(X) is not 0. It will be recalled that by definition $\alpha^m \geq \gamma^m$. In addition, based on the assumption that only unipolar binary numbers are used to represent the neurons, the threshold of the analog value of X' must be taken. The transformed unipolar positive binary-neuron vector is then used for the succeeding iterating operations. If the threshold is set to be at least greater than $$\sum_{m=1}^{M} \gamma^m,$$

Equation (23) may then be expressed as $$X' = \sum_{m=1}^{M} [(\alpha^m + \gamma^m)V^m + \gamma^m g(X)]. \qquad (24)$$

Thus, with this limitation on the threshold value, the resultant unipolar positive binary-neuron vector will be the same when the value of X' in either Equation (23) or Equation (24) is used in taking the threshold. However, the addition operation in Equation (24) is easily realizable in optics, so it is that equation that is implemented in an inner-product unipolar TABAM architecture with adaptive thresholding which will be described below with reference to FIG. 8. It can be shown that from a theoretical point of view, the restriction placed on the threshold is reasonable. Nevertheless, the proper value of the threshold should be determined empirically by computer simulation and comparison with an optical experimentation.

EXAMPLES AND EXTENSIONS OF A TABAM

In the following examples, the TABAM models are described and the adaptive threshold values of the TABAM are determined through theoretical derivations in the following discussion.

As noted hereinbefore, it is difficult to implement subtraction using optics. To avoid subtraction, an adaptive thresholding technique is used in the TABAM examples. Before the adaptive thresholding techniques are discussed, the TABAM model is briefly reviewed. One assumes that the ith component of the state vector $x_i$ at time t+1 may be written as a function of t (where t is an integer, a discrete representation of the time steps) as follows:

$$x_i(t+1) = \sum_{m=1}^{M} v_i^m \alpha^m(t) + I_i, \qquad (25a)$$

where $$I_i = -\sum_{m=1}^{M} \alpha^m(t)[g(x_i(t)) - v_i^m]^{1/3}\delta^m(t), \qquad (25b)$$

$$\delta^m(t) = \exp\left(-\beta \sum_{i=1}^{N} [g(x_i(t)) - v_i^m]^2\right), \qquad (25c)$$

$$\alpha^m(t) = \sum_{j=1}^{N} v_j^m g(x_j(t)), \qquad (25d)$$

where $g(x_j(t))$ is a logistic (sigmoidal) function $$g(x_j(t)) = 1/(1 + \exp(-a[x_j(t) - \theta(t)])). \qquad (25e)$$

The constant a in the sigmoidal, or nonlinear activation function decides the slope of the nonlinear thresholding function and $\theta(t)$ is the threshold. In Equation (1), $v_i^m$ denotes the ith component of the mth stored vector $V^m$, $\beta$ is a constant, and M and N are the numbers of stored vectors and the number of neurons, respectively. Based on the property of the unipolar representation of a binary system, Equation (25a) can be rewritten as $$x_i(t+1) = \sum_{m=1}^{M} \alpha^m(t)[(1 + \delta^m(t))v_i^m - g(x_i(t))\delta^m(t)], \qquad (26)$$

since $$g(x_i(t)) - v_i^m = 1, 0, \text{ or } -1 \qquad (27a)$$

and $$[g(x_i(t)) - v_i^m]^{1+\text{hu } 1/3+i} = g(x_i(t)) - v_i^m. \qquad (27b)$$

Unipolar Inner-Product TABAM (UIT) Model

Instead of implementing the subtraction in Equation (26) optically, an adaptive threshold function is introduced following the modification of Equation (26) as follows:

$$x_i(t+1) = \sum_{m=1}^{M} \alpha^m(t)[(1 + \delta^m(t))v_i^m + g(x_i(t))\delta^m(t)]. \qquad (28)$$

Optical implementation of Equation (28) is referred to as the UIT.

Figure 7:
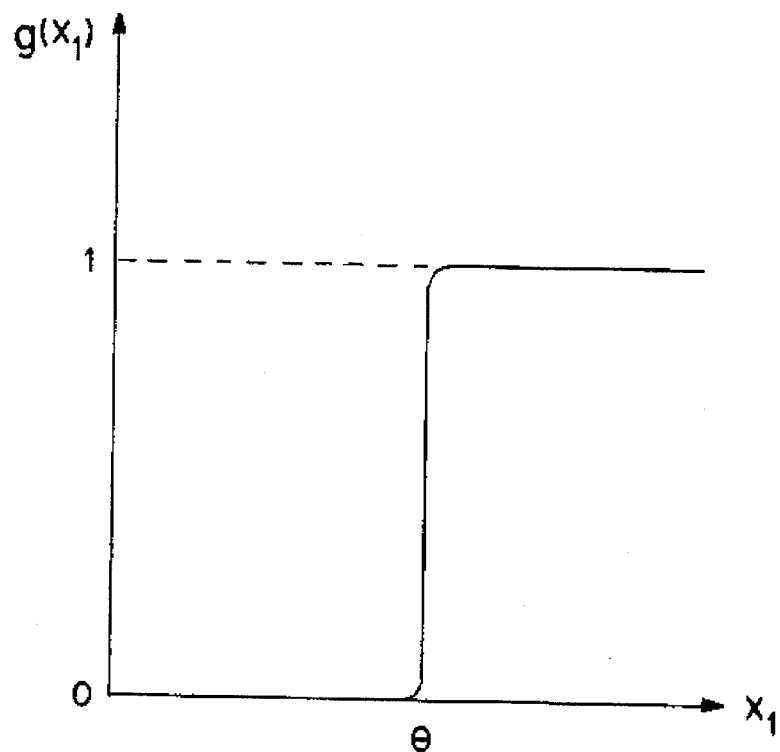
FIG. 7 illustrates a dynamic logistic (sigmoidal) function with a sharp transition at $x_i=\theta$ (adaptive threshold).

In Equation (28), a logistic function, as illustrated in FIG. 7 with an adaptive threshold $\theta(t)$, is used to perform the nonlinear transform such that the output attains quasi-binary states, which are defined when the constant a in the logistic function becomes very large but is still finite. The logistic function is continuous and has a large slope around the threshold $\theta(t)$. This will provide the terminal attractor with a continuous logistic function in a binary system. The selection of the constant a depends on the numerical resolution in the system.

The adaptive threshhold $\theta(t)$ will be determined for an ideal case and then generalized for a realistic case. In the ideal case, all of the stored states are orthogonal to one another; hence, the system is crosstalk-free.

When there is no crosstalk, the threshold $\theta(t)$ is set as $$\theta(t) = \alpha^{m'}(t)\left[\frac{1}{2} + \delta^{m'}(t)\right], \quad (29)$$

where $\alpha^{m'}(t)$ is the inner product between $x(t)$ and the mth stored vector, $V^m$ and $$\alpha^m(t)=0 \text{ for all } m \neq m'.$$

Furthermore, the threshold $\theta(t)$ is set according to the following four possible cases:
Case 1: if $v_i^{m'}=1$, and $g(x_i(t))\approx 1$, then $x_i(t+1)\approx\alpha^{m'}(t)(1+2\theta^{m'}(t))$.
Case 2: if $v_i^{m'}=0$, and $g(x_i(t))\approx 0$, then $x_i(t+1)\approx 0$.
Case 3: if $v_i^{m'}=1$, and $g(x_i(t))\approx 0$, then $x_i(t+1)\approx\alpha^{m'}(t)(1+\theta^{m'}(t))$.
Case 4: If $v_i^{m'}=0$, and $g(x_i(t))\approx 1$, then $x_i(t+1)\approx\alpha^{m'}(t)\theta^{m'}(t)$.

Figure 8:
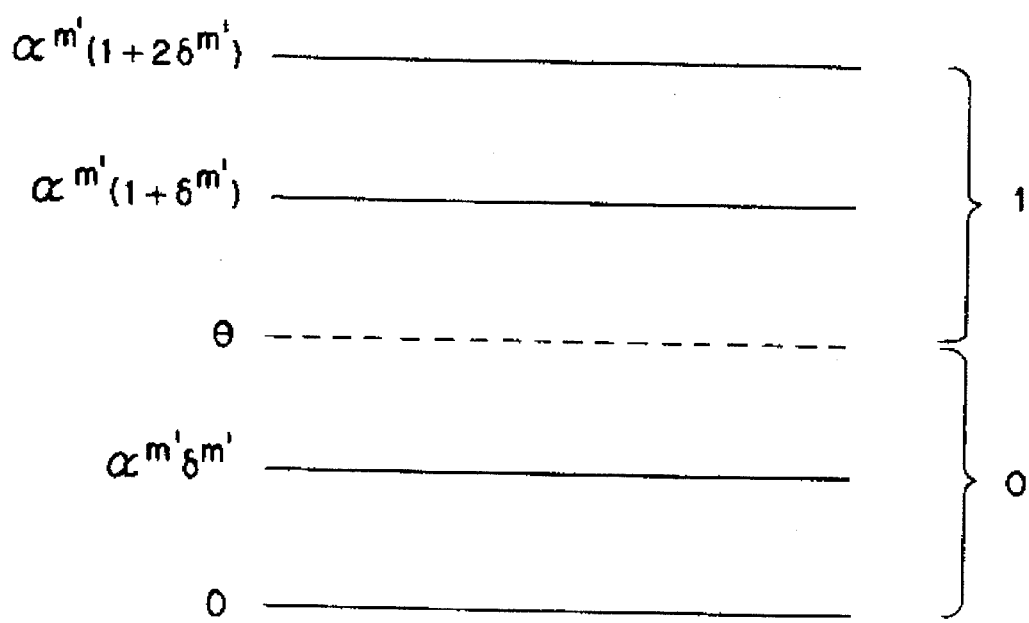
FIG. 8 illustrates in a graph how the adaptive threshold, $\theta$, can be set to achieve the maximum noise immunity in the system of FIG. 10.

In order to cause the states to converge to the stored states, a threshold should be based on Equation (29) for maximum noise immunity between cases (3) and (4) as shown in FIG. 8. The threshold is set between the lower value of the desired output (state 1) and the higher value of the desired output (state 0). For a more practical situation, the stored states are not orthogonal to one another, so crosstalk often occurs between similar stored vectors. For the nonorthogonal case, $\theta(t)$ is set to be:

$$\theta(t) = \sum_{m=1}^{M} \alpha^m(t)\left[\frac{1}{2} + \delta^m(t)\right]. \quad (30)$$

Crosstalk Inner-Product Terminal-Attractor (CRIT) Model

When the crosstalk corrupts the desired state due to the weighing process of the inner-product approach, and because every stored vector contributes the inner product to the summation in Equation (25) even though it is quite different from the input vector (as long as the inner product is not zero), the threshold $\theta(t)$ set by Equation (30) cannot provide an appropriate thresholding mechanism. In order to reduce/eliminate the crosstalk problem, a new model called CRIT is presented as an example as follows:

$$x_i(t+1) = \sum_{m=1}^{M} \alpha^m(t)\delta^m(t)[(1+\delta^m(t))v_i^m + g(x_i(t))\delta^m(t)]. \quad (31)$$

Equation (31) indicates that the crosstalk between the nonorthogonal stored vectors is exponentially weighed and reduced by the exponential term $\delta^m(t)$. The property of the basin of terminal attractors is controlled by the value of $\beta$ in $\delta^m(t)$, which will be discussed below in detail. Using the CRIT example, the retrieved state vector is highly likely to be placed in a correct basin similar to the effect resulting from the multiplication between the weight matrix and the nonlinearly activated input vector in Zak's model. Then the corresponding terminal attractor forces the state vector to converge rapidly to the bottom of the basin. This example does not need time for training and is more suitable for optoelectronic implementation for terminal attractors since the stored vectors can be used directly. The threshold can be set in a manner similar to that used in Equation (30) as follows:

$$\theta(t) = \sum_{m=1}^{M} \alpha^m(t)\delta^m(t)\left[\frac{1}{2} + \delta^m(t)\right]. \quad (32)$$

Basic to the UIT and the CRIT is the terminal attractor, $I_i$, used in each iteration. Consequently, basic to this invention is a TABAM which, unlike that of Zak, supra, can be implemented optically to provide a neural dynamic system having finite relaxation times, no spurious states, and virtually infinite stability for use in real-time, high-density associative memory applications.

Computer Simulation

In order to test the effectiveness of the examples of UIT and CRIT using the adaptive threshold, a computer simulation was used. The XOR logic operation was used to detect the Hamming distance between the state vector, $x(t)$, and the stored vectors, $V^m$. The input-output relationship of XOR operation is shown in Table 2.

TABLE 2

| Exclusive OR (XOR) Relationship | | |
|---|---|---|
| Input 1 | Input 2 | Output |
| 1 | 1 | 1 |
| 0 | 1 | 0 |
| 1 | 0 | 0 |
| 0 | 0 | 1 |

The Hamming distance between the state vector, $x(t)$, and the stored vectors can be computed by using XOR as follows. For a unipolar system, $$[g(x_i(t))-v_i^m]^2 \approx |g(x_i(t))-v_i^m| \quad (33)$$

Because $g(x_i(t))$ is very close to 0 or 1, and $v_i^m$ is 0 or 1, Equation (33) is a reasonable approximation. The Hamming distance between $g(x_i(t))$ and $v_i^m$ is shown in Table 3.

TABLE 3

| Hamming Distance Between $g(x_i(t))$ and $v_i^m$ | | |
|---|---|---|
| $g(x_i(t))$ | $v_i^m$ | $|g(x_i(t))-v_i^m|$ |
| 1 | 1 | 0 |
| 0 | 1 | 1 |
| 1 | 0 | 1 |
| 0 | 0 | 0 |

Based on Tables 2 and 3, the Hamming distance is found to be $$\sum_{i=1}^{N}[g(x_i(t))-v_i^m]^2 = \sum_{i=1}^{N}|g(x_i(t))-v_i^m| \quad (34)$$

$$= \sum_{i=1}^{N}[1-g(x_i(t))XOR v_i^m]$$

$$= N - \alpha^m(t),$$

where $$\alpha^m(t) = \sum_{i=1}^{N} g(x_i(t))XOR v_i^m.$$

Equation (34) provides a similar measure between $g(x(t))$ and $V^m$ and is equivalent to the inner product of a bipolar system. The exponential term can be calculated easily after the Hamming distance is obtained.

$$\delta^m(t) = \delta^{-\beta[N-\alpha^m(t)]} \quad (35)$$

based on the definition in Equation (25).

Simulation Results

Based on the above, two computer simulation programs were used to test the feasibility of the models: (1) an exhaustive test program for simulating every possible stored and input vectors in small-scale networks of UIT and CRIT, and (2) a Monte Carlo simulation code for testing randomly generated stored and input vectors in large-scale networks of CRIT.

In the first program, the number of neurons and stored states selected is small. The number of stored vectors is two and three for all the possible states in both three-and four-neuron networks. For small N and M, all possible combinations of vectors are stored and retrieval is tested for all possible input vectors using an IBM PC 386 for the simulation. An associative recall result is considered accurate when the Hamming distance between the input vector and the stored vector to which it converges is the smallest. The accuracy can be determined in all cases except those in which the input vector has a Hamming distance equal to two or more stored vectors. In this case, it is impossible to decide to which os the stored states the input should converge; however, because the Hamming distances are equal, the choice is inconsequential. The simulation results of the UIT (Equation (28)) and CRIT (Equation (31)) are presented in Table 4.

TABLE 4

Computer Simulation Results of UIT and CRIT

| Model | N | M | Convergence |
|-------|---|---|-------------|
| UIT   | 3 | 2 | 100%        |
| UIT   | 3 | 3 | 100%        |
| UIT   | 4 | 2 | 100%        |
| UIT   | 4 | 3 | 95.7%       |
| CRIT  | 3 | 2 | 100%        |
| CRIT  | 3 | 3 | 100%        |
| CRIT  | 4 | 2 | 100%        |
| CRIT  | 4 | 3 | 100%        |

The 95.7% convergence accuracy of M=3 and N=4 of the UIT is due to the crosstalk effect. The inaccuracy is removed by the CRIT as shown in Table 4. When M and N are further increased, the computer time for exhaustive testing simulation becomes considerably longer. Hence, a Monte Carlo simulation is used to test randomly generated patterns to evaluate the accuracy of retrieval.

For the second program, a Monte Carlo simulation code was developed in a SunSPARC 2 workstation to simulate a CRIT network with a set of randomly generated stored vectors (al of which are different) and to test the network with a set of randomly generated input vectors to measure the accuracy of correct convergence. As shown in Table 4, only 16 cases are selected from a significant number of performed tests to demonstrate the perfect convergence of the CRIT network. Each row in the table specifies the number of neurons in the network, the number of stored vectors in a set, the number of test vectors in a set, and the number of sets of stored vectors tested. Using the last row of Table 4 as an example: 64 different sets of stored patterns are used for testing. Each set of stored patterns has 1024 patterns and is tested by a set of 256 test patterns. Each set of test patterns is generated randomly and independently for each set of stored patterns. Based on the Monte Carlo simulation results, the CRIT model works well—achieving 100% accuracy—for large-scale networks even when M=4N.

Based on the results of the computer simulation, it was seen that even with M=4N, perfectly accurate convergence could be accomplished by CRIT.

Experimental Set-up

Figure 9:
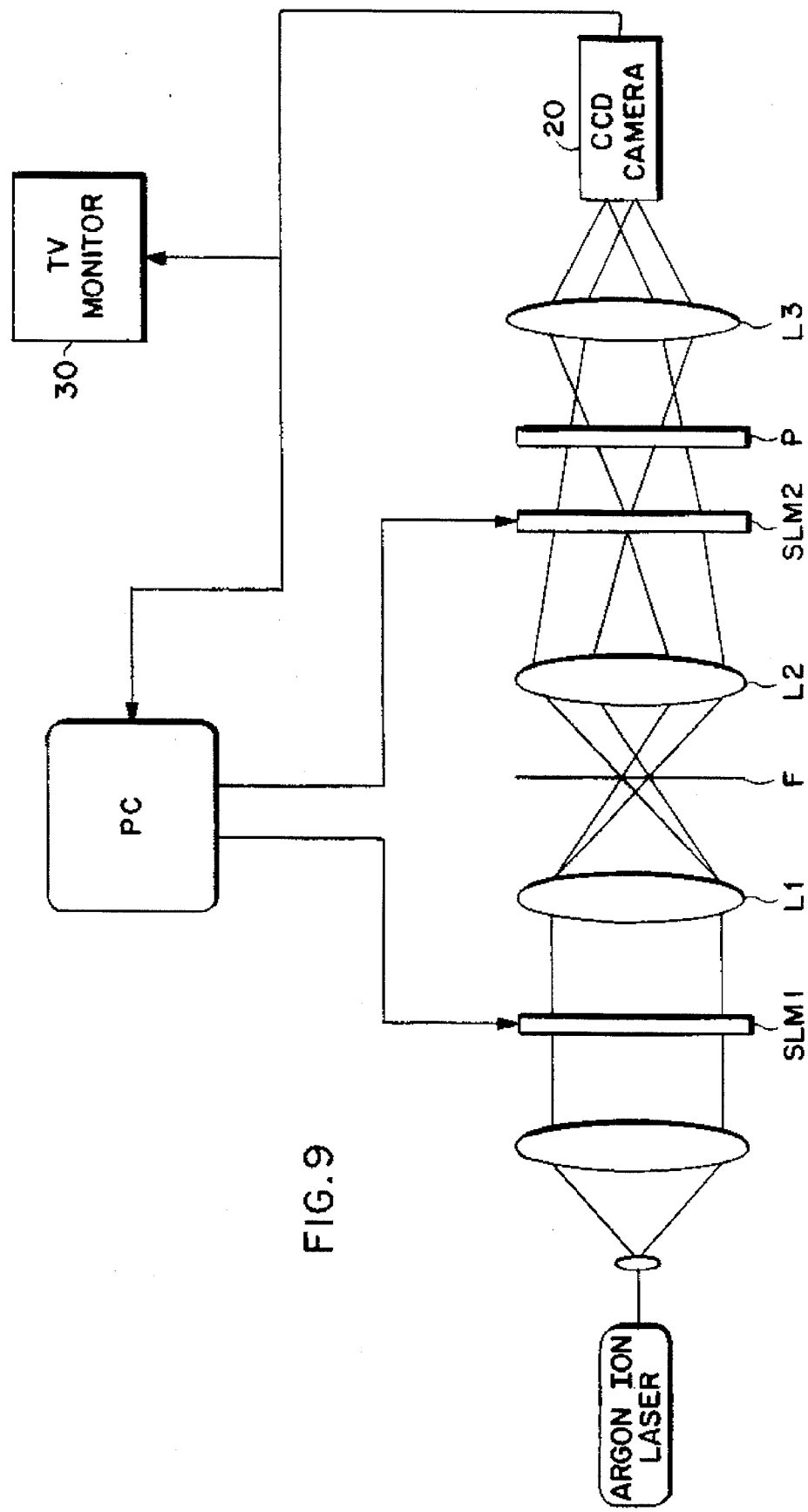
FIG. 9 illustrates an experimental set-up used to demonstrate the feasibility of the optical XOR operation in the system of FIG. 10.

In discussing the feasibility of optoelectronic implementation of the models, a typical example with four neurons and two stored states is described below. The experimental set-up is shown in FIG. 9. For simplicity, M was chosen to be two and N>M. Because of the small number of images stored, a multifocus hololens was not needed to replicate the input vector x(t). The LCTVs from an Epson video projector were used as spatial light modulators SLM1 and SLM2. The input vector x(t) from a frame grabber of a computer PC was sent to SLM1, which is illuminated by a collimated beam from an Argon ion laser 10 via a spreading lens 11 and a collimating lens 12. The image is Fourier transformed by lens L1 and filtered by two pin holes in a filter plate F in order to pass the +1 and −1 diffraction orders of grid patterns of the LCTV SLM1. The +1 and −1 orders, once they have passed through the pin holes (filters), are inversely Fourier transformed by lens L2, and the XOR operations are performed with the two stored vectors in SLM2 from the computer PC. The signals resulting from XOR operations are detected by a CCD camera 20 and sent to the computer PC to calculate the next state vector, x(t+1). The output x(t+1) is the input as a new state to SLM1 for the dynamical system. This process is iterated until convergence is reached. The converged state is displayed on SLM1 or on a monitor 30.

Experimental Results

A typical example associated with the experiment is presented below. Assume the input vector is:

$$\begin{vmatrix} 1 & 0 \\ 1 & 1 \end{vmatrix}$$

where 1 represented a bright pixel and zero represents a dark pixel. The two stored images (vectors) are assumed to be:

$$\begin{vmatrix} 1 & 1 \\ 1 & 1 \end{vmatrix}$$

and $$\begin{vmatrix} 1 & 1 \\ 0 & 1 \end{vmatrix}$$

denoted as stored vector No. 1 and No. 2, respectively. The output images resulting from the XOR operations between the input and the two stored images are:

$$\begin{vmatrix} 1 & 0 \\ 1 & 1 \end{vmatrix}$$

and $$\begin{vmatrix} 1 & 0 \\ 0 & 1 \end{vmatrix}$$

The output images following the XOR operations appear as two spots of different intensity on the CCD. The computer can use an adaptive thresholding technique as shown in Equations (4) or (8) to perform the iterative computation.

The result obtained for the UIT before taking the threshold is:

$$\begin{vmatrix} 7.7 & 6.4 \\ 5.5 & 7.7 \end{vmatrix}$$

and the threshold, $\theta$, of the logistic function is 3.9 (when one sets $\beta=10$). After taking the threshold, the result is the stored vector No. 2, which shows an accurate retrieval. The result of the subsequent iteration before thresholding is:

$$\begin{vmatrix} 17 & 17 \\ 13 & 17 \end{vmatrix}$$

where $\theta=9$. The result after thresholding is again the stored vector No. 2, indicating accurate convergence.

On the other hand, the result obtained for the CRIT before thresholding is:

$$\begin{vmatrix} 2.3 & 1.8 \\ 2.0 & 2.3 \end{vmatrix}$$

After taking the threshold with θ=1.1 (β=1.0), the result is the same as that of the UIT. The result after the next iteration before thresholding is:

$$\begin{vmatrix} 14 & 14 \\ 12 & 14 \end{vmatrix}$$

hence converges to the correct state. The above example offers a feasibility demonstration of using a computer to perform nonlinear thresholding and feedback.

The inner-product neural network system shown in FIG. 10 will now be described to illustrate the optical implementation of a unipolar terminal-attractor based on neural associative memory (TABAM) achieved through proper application of an adaptive thresholding technique described with reference to FIGS. 7 and 8 to avoid subtraction in the optics.

Figure 10:
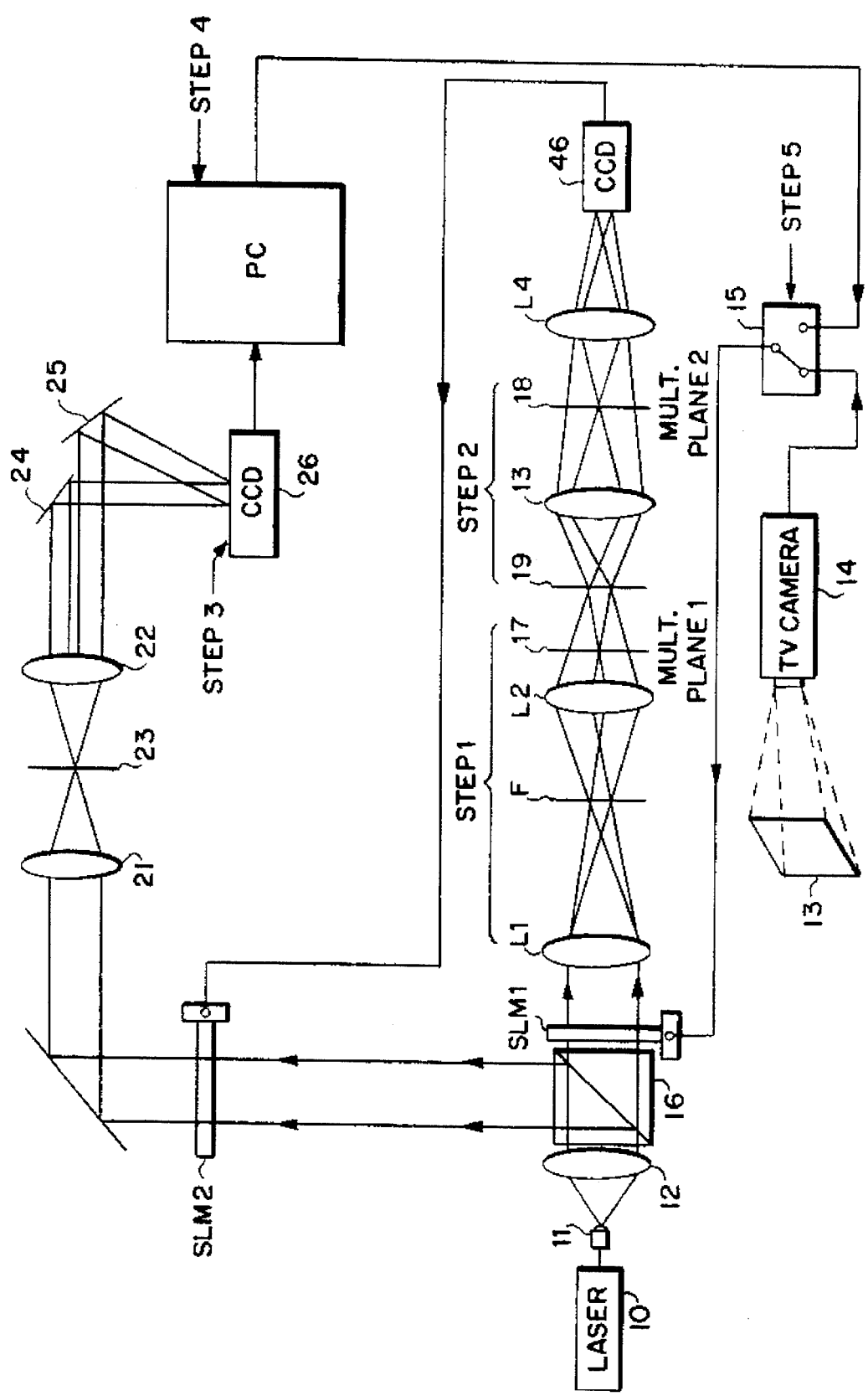
FIG. 10 illustrates an optical inner-product neural network system with thresholding in accordance with the present invention.

The experimental set-up in FIG. 9 used to demonstrate the feasibility of the optical XOR operation is shown in the system of FIG. 10 and identified by the same reference characters used there to depict the inner-product (exclusive-OR) operation. The object of this example is to demonstrate the feasibility of optical implementation of a TABAM illustrated in FIG. 1. For simplicity, M is chosen to be two while N is chosen to be sixteen. Because of the small number of images stored in a storage transparency S, a multifocus hololens is not needed to replicate the input vector. A photograph 13 of the input vector is used with a television camera 14 for entering the initial input vector x(t) through the electronically addressable spatial light modulator SLM1, e.g., a liquid crystal television spatial light modulator (LCTV SLM) while a switch 15 is in the position shown.

The spatial light modulator SLM1 is illuminated by a collimated beam from the argon laser 10 via the spreading lens 11, the collimating lens 12 and a beamsplitter 16. The image is Fourier transformed by the lens L1 and filtered by the two pin holes in the filter plate F to pass the ±1 orders of the images diffracted by the inherent grid patterns of the spatial light modulator SLM1. The passed ±1 orders are refocused by a subsequent Fourier transform lens L2 and multiplied by two images stored in a transparency 17 placed at a first multiplication plane. This completes the inner-product operation of step 1.

In practice, this example would not be feasible for a large number M of stored vectors. If M>2, a Dammann grating would be used as the means for replicating the input vector x(t) a number of times equal to M, and in the usual application of the invention electronically addressable spatial light modulators would replace the transparency 17 which stored the M vectors at the first multiplication plane and a similar transparency 18 at a second multiplication plane needed in the next step.

A fine grain diffuser 19 is used to convert the inner products α_i into scalars (light intensity spots) which are focused by a Fourier transform lens L3 from the plane where the diffuser 19 is placed into the transparency 18 at the second multiplication plane referred to above. The focused light spots through the lens L3 represent the scalar quantity $\alpha^m(t)$ of the inner products between the input vector x(t) and the stored vectors $V_i^m$. The function of the diffuser is to create uniform light distributions that are proportional to the inner-product scalar. The uniformly distributed scalar light patterns at the second multiplication plane are thus weighted by the vectors $V_i^m$ that are stored in the transparency 18 placed at the second multiplication plane. That completes step 2.

The weighted vectors $v_i^m \alpha^m(t)$ of Equation (25a) are imaged by a Fourier transform lens L4 onto the CCD camera 20 the video output of which is transmitted to an electronically controlled liquid crystal spatial light modulator SLM2. The vectors are there illuminated by coherent light from the laser 10 vis the lenses 11, 12 and the beamsplitter 17. For the purpose of improving the contrast of the liquid crystal spatial light modulator SLM2, the vector images introduced there are enhanced by lenses 21 and 22 and low-pass filtered by a pin-hole spatial filter 23. However, it should be noted that if a high contrast liquid crystal spatial light modulator is used, this spatial filtering process for enhancement can be omitted. In this example, the contrast enhanced images are then reflected by separate mirrors 24 and 25 that are oriented so that the images are superimposed on an output CCD 26 which serves the dual function of optical summation of the vector images at the input side (step 3) and transmitting the sum at the output side to a programmed digital computer PC for performing the operation $x_i(t+)$ of Equation (25a) by performing the calculations of Equations (25b), (25c) and (25d). In each computation equation $g(x_j(t))$ is a logistic (sigmoidal) function set forth in Equation (25e), which includes the thresholding function θ(t). This concludes in step 4 a complete iteration. The next step 5 is to introduce the next input vector $x_i(t+1)$ computed by the computer PC to the input spatial light modulator SLM1 via the switch 15 which, after the first vector x(t) is entered, is switched to its alternate state to receive each subsequent $x_i(t+1)$. Iterations of the five steps continue until convergence is reached. The output from the PC is $g(x_i(t+1))$. It should be noted that this optical implementation may be generated in accordance with the Equations (26) through (29) for a unipolar inner-product TABAM (UIT) model and in accordance with Equations (30) through (32) for a crosstalk inner-product terminal attractor (CRIT).

Although particular embodiments of the invention have been described and illustrated herein, it is recognized that modifications and variations may readily occur to those skilled in the art. Consequently, it is intended that the claims be interpreted to cover such modifications and equivalents.

We claim:

1. In a neural-network associative memory having means for storing a set of N-tuple neuron-state vectors as terminal attractors, an iterative neural dynamic system for retrieving one of said stored vectors which best matches an input vector x'_i in which the iterative neural dynamics of said system are given by $$x_i' = \sum_{j=1}^{N} T_{ij} \cdot g(x_j) + I_i$$

where $T_{ij}$ is the ith row and jth column element of a weight matrix, and $g(x_i)$ is a sigmoidal threshold function, where $$I_i = \sum_{m=1}^{M} \alpha^m [g(x_i) - u_i^m]^{1/3} \exp\{-\beta_i^m [g(x_i) - u_i^m]^2\}$$

and $$\alpha^m = \sum_{j=1}^{N} u_j^m g(x_j)$$

is a parameter that is the inner product between one of said stored vectors and a vector of a preceding iteration that has a similarity between said one of said stored vectors and said computed vector, $\beta^m_i$ is a constant $\beta^m$, and $g(x_j)$ is a sigmoidal function of tanh $ax_j$, where $\lim_{a\to\infty} g(x_j)$ is a binary component, and $$T_{ij} = \sum_{m=1}^{M} u_i^m u_j^m,$$

whereby $$x_i' = \sum_{m=1}^{M} \alpha^m u_i^m - \sum_{m=1}^{M} \alpha^m [g(x_i) - u_i^m]^{1/3} \times \exp\{-\beta_i^m [g(x_i) - u_i^m]^2\}.$$

2. An iterative neural dynamic system as defined in claim 1 wherein $\beta^m_i$ is a constant $\beta^m$ set in a collective manner $$\exp\{-\beta_i^m [g(x_i) - v_i^m]^2\} \to \exp\left\{-\beta^m \sum_{i=1}^{N} [g(x_i) - v_i^m]^2\right\}$$

$$\beta_i^m = \beta^m, i = 1, \ldots, N.$$

3. An iterative neural dynamic system as defined in claim 2 wherein said neuron-state vectors are unipolar binary numbers, in which case $$X' = \sum_{m=1}^{M} [V^m \cdot g(X)] \times (V^m + \{\exp[-\beta^m |V^m - g(X)|^2]\}[V^m - g(X)]),$$

wherein X' is an updated activation-potential vector and $g(x)$ is a threshold vector where a function g is applied to every term of x in taking a threshold value, whereby X' comprises the inner product of $v^m \cdot g(x)$ and $v^m - g(x)$.

4. An iterative neural dynamic system as defined in claim 3 wherein no weight matrix is used in an optical implementation of an inner-product neural-network associative memory in accordance with $$X' = \sum_{m=1}^{M} [V^m \cdot g(X)]\{1 + \exp[-\beta^m |V^m - g(X)|^2]\}V^m - \sum_{m=1}^{M} V^m \cdot g(X)\exp[-\beta^m |V^m - g(X)|^2]g(X)$$

which contains two operations, namely an inner-product operation and an exclusive-OR operation between $V^m$ and $g(x)$.

5. An iterative neural dynamic system as defined in claim 4 wherein unipolar positive binary representation is used for vectors, wherein said optical implementation is in accordance with $$X' = \sum_{m=1}^{M} [V^m \cdot g(x)](1 + \exp\{-\beta^m [N - V^m \cdot g(X)]\})V^m -$$

$$\sum_{m=1}^{M} [V^m \cdot g(X)]\exp\{-\beta^m [N - V^m \cdot g(X)]\}g(X)$$

$$= \sum_{m=1}^{M} \alpha^m \{1 + \exp[-\beta^m (N - \alpha^m (N - \alpha^m)]\}V^m -$$

$$\sum_{m=1}^{M} \alpha^m \exp[-\beta^m (N - \alpha^m)]g(X),$$

where $\alpha^m = V^m \cdot g(X)$ and N is the maximum value of $V^m \cdot g(X)$.

6. An iterative neural dynamic system as defined in claim 5 wherein $$\alpha^m \exp[-\beta^m (N-\alpha^m)] = \gamma^m,$$

whereby $$X' = \sum_{m=1}^{M} [(\alpha^m + \gamma^m)V^m - \gamma^m g(X)].$$

7. An iterative neural dynamic system as defined in claim 6 wherein $$\alpha^m \exp[-\beta^m (N-\alpha^m)] = \gamma^m$$

is computed by a digital computer in an iteration loop and the subtraction in $$X' = \sum_{m=1}^{M} [(\alpha^m + \gamma^m)V^m - \gamma^m g(X)]$$

is carried out optically by thresholding analog values of X' to form a unipolar positive binary neuron vector for a succeeding iteration, whereby $$X' = \sum_{m=1}^{M} [(\alpha^m + \gamma^m)V^m + \gamma^m g(X)].$$

8. An iterative neural dynamic system as defined in claim 7 wherein threshold values are determined, and wherein an ith component of a state vector $x_i$ at time t+1 is given by $$x_i(t+1) = \sum_{m=1}^{M} v_i^m \alpha^m(t) + I_i,$$

where $$I_i = \sum_{m=1}^{M} \alpha^m(t) [g(x_i(t)) - v_i^m]^{1/3} \delta^m(t),$$

$$\delta^m(t) = \exp\left(-\beta \sum_{i=1}^{N} [g(x_i(t)) - v_i^m]^2\right),$$

$$\alpha^m(t) = \sum_{j=1}^{N} v_j^m g(x_j(t)),$$

where $g(x_j(t))$ is a nonlinear sigmoidal function $$g(x_j(t)) = 1/(1+\exp(-a[x_j(t)-\theta(t)])),$$

and a constant a in said sigmoidal function is an activation function which determines a slope of said nonlinear sigmoidal function and $\theta(t)$ is a threshold value.

9. An iterative neural dynamic system as defined in claim 8 wherein $x_i(t+1)$ is determined in accordance with $$x_i(t+1) = \sum_{m=1}^{M} \alpha^m(t)[(1 + \delta^m(t))v_i^m - g(x_i(t))\delta^m(t)],$$

since $$g(x_i(t)) - v_i^m = 1, 0, \text{ or } -1$$

and $$[g(x_i(t)) - v_i^m]^{1+hu\ 1/3+i} = g(x_i(t)) - v_i^m,$$

and wherein subtraction in determining $x_i(t+1)$ is implemented by thresholding in accordance with $$x_i(t+1) = \sum_{m=1}^{M} \alpha^m(t)[(1 + \delta^m(t))v_i^m + g(x_i(t))\delta^m(t)].$$

10. An iterative neural dynamic system as defined in claim 9 wherein said threshold in implementing said thresholding is set at $$\theta(t) = \alpha^{m'}(t)[\tfrac{1}{2} + \delta^{m'}(t)].$$

11. An iterative neural dynamic system as defined in claim 10 wherein $x_i(t+1)$ is determined in accordance with $$x_i(t+1) = \sum_{m=1}^{M} \alpha^m(t)\delta^m(t)[(1+\delta^m(t))v_i^m + g(x_i(t))\delta^m(t)],$$

said threshold value in implementing said thresholding is set at $$\theta(t) = \sum_{m=1}^{M} \alpha^m(t)\delta^m(t)\left[\tfrac{1}{2} + \delta^m(t)\right].$$

12. An iterative neural dynamic system as defined in claim 1 wherein said input neuron-state vectors are represented by a two-dimensional form of $N^2$ pixels, and an interconnection matrix of $N^4$ pixels, wherein $$X_{ij} = \sum_{k=1}^{N}\sum_{l=1}^{N} T_{ijkl}g(x_{kl}) - \sum_{m=1}^{M} \alpha^m[g(x_{ij}) - v_{ij}^m]^{1/3} - \exp\{\beta_{ij}^m[g(x_{ij}) - v_{ij}^m]^2\},$$

where $g(x_{ij})$ denotes a threshold ith row and jth column component of a neuron-state vector arranged in a two-dimensional matrix and $T_{ijkl}$ represent a component of said $N_4$ interconnection matrix.

* * * * *